United States Patent
Bang et al.

(10) Patent No.: US 11,212,042 B2
(45) Date of Patent: Dec. 28, 2021

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Jonghyun Bang, Suwon-si (KR); Jinyoung Oh, Suwon-si (KR); Hyunseok Ryu, Suwon-si (KR); Sungjin Park, Suwon-si (KR); Jeongho Yeo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 136 days.

(21) Appl. No.: 16/685,647

(22) Filed: Nov. 15, 2019

(65) Prior Publication Data
US 2020/0162203 A1      May 21, 2020

(30) Foreign Application Priority Data
Nov. 16, 2018   (KR) .................... 10-2018-0141958

(51) Int. Cl.
| *H04L 1/18* | (2006.01) |
| *H04L 1/16* | (2006.01) |
| *H04W 72/04* | (2009.01) |
| *H04L 5/00* | (2006.01) |
| *H04W 72/14* | (2009.01) |

(52) U.S. Cl.
CPC .......... *H04L 1/1819* (2013.01); *H04L 1/1614* (2013.01); *H04L 5/0055* (2013.01); *H04W 72/042* (2013.01); *H04W 72/14* (2013.01)

(58) Field of Classification Search
CPC combination set(s) only.
See application file for complete search history.

(56) References Cited

U.S. PATENT DOCUMENTS

| 2018/0270022 A1* | 9/2018 | Sun ...................... H04L 1/0061 |
| 2018/0302128 A1* | 10/2018 | Akkarakaran ........ H04L 1/1864 |
| 2019/0393990 A1* | 12/2019 | Wong .................... H04L 5/0055 |

(Continued)

FOREIGN PATENT DOCUMENTS

WO       2019/216705 A1    11/2019

OTHER PUBLICATIONS

International Search Report dated Feb. 25, 2020, issued in an International Application No. PCT/KR2019/015658.

(Continued)

*Primary Examiner* — Vinncelas Louis
(74) *Attorney, Agent, or Firm* — Jefferson IP Law, LLP

(57) ABSTRACT

A method of performing, by a base station, communication in a wireless communication system is provided. The method includes obtaining feedback configuration information of a hybrid automatic repeat request (HARQ) process for performing a feedback, in a unit of code block group (CBG), on a result of decoding, comparing a size of a bitmap required for the feedback in the unit of CBG with a size of an available bitmap of the base station, and transmitting feedback information in which a number of bits are restricted according to a preset method, when the size of the bitmap required for the feedback is greater than the size of the available bitmap.

16 Claims, 13 Drawing Sheets

(56) References Cited

U.S. PATENT DOCUMENTS

2021/0044392 A1    2/2021   Myung et al.

OTHER PUBLICATIONS

CATT; DL control signaling design for CBG-based operation; 3GPP TSG RAN WG1 Meeting #AH_NR2; R1-1710096 Jun. 17, 2017, Qingdao, P. R. China.
Sequans; HARQ-Ack/Nack for DL CBG based transmission; 3GPP TSG RAN WG1 Meeting AH_NR#3; R1-1716066 Sep. 11, 2017, Nagoya, Japan.
Huawei, HiSilicon; Remaining issues on HARQ; 3GPP TSG RAN WG1 Meeting 91; R1-1719401; Nov. 18, 2017, Reno, USA.
Huawei, HiSilicon; Summary of remaining issues on CBG-based (re)transmission; 3GPP TSG RAN WG1 Ad Hoc Meeting; R1-1800075; Jan. 13, 2018, Vancouver, Canada.
European Office Action dated Nov. 11, 2021, issued in European Application No. 19883876.5.

* cited by examiner

FIG. 5

| Grant-free PUSCH HARQ-ID #0 (500) | Grant-free PUSCH HARQ-ID #1 (501) | Grant-free PUSCH HARQ-ID #2 (502) | Grant-based PUSCH HARQ-ID #3 (503) | Grant-based PUSCH HARQ-ID #4 (504) | Grant-free PUSCH HARQ-ID #5 (505) |
|---|---|---|---|---|---|
| 1 | 0 | 0 | 1 | 0 | 1 |
| 1111 | 1000 | 0101 | 1 (506) | 0 (507) | 1111 |

HARQ-ACK

CBG-based HARQ-ACK

FIG. 6

| | Grant-free PUSCH HARQ-ID #0 (600) | Grant-free PUSCH HARQ-ID #1 (601) | Grant-free PUSCH HARQ-ID #2 (602) | Grant-based PUSCH HARQ-ID #3 (603) | Grant-based PUSCH HARQ-ID #4 (604) | Grant-free PUSCH HARQ-ID #5 (605) |
|---|---|---|---|---|---|---|
| HARQ-ACK bitmap | 1 | 0 | 0 | 1 | 0 | 1 |
| CBG-based HARQ-ACK bitmap | 1111 | 1000 | 0111 | 1 | 0 | 1111 |
| CBG-based HARQ-ACK bitmap with same bunding size | 11 (606) | 00 (607) | 01 (608) | 1 | 0 | 11 (609) |

Freq. resource

FIG. 8

| Grant-free PUSCH HARQ-ID #0 (800) | Grant-free PUSCH HARQ-ID #1 (801) | Grant-free PUSCH HARQ-ID #2 (802) | Grant-based PUSCH HARQ-ID #3 (803) | Grant-based PUSCH HARQ-ID #4 (804) | Grant-free PUSCH HARQ-ID #5 (805) |
|---|---|---|---|---|---|
| 1 | 0 | 0 | 1 | 0 | 1 |
| 1111 | 1000 | 0000 | 1 | 0 | 0000 |
| 1 (811) | 1 (812) | 0 (813) | 1 | 0 (814) | 0 (815) |
| 1111 ~ (806) | 1000 ~ (807) | X ~ (808) | 1 | X ~ (809) | X ~ (810) |

HARQ-ACK bitmap
CBG-based HARQ-ACK bitmap
HARQ ID bitmap
CBG-based HARQ-ACK bitmap with different bundling size Freq. resource

METHOD AND APPARATUS FOR PERFORMING COMMUNICATION IN WIRELESS COMMUNICATION SYSTEM

CROSS-REFERENCE TO RELATED APPLICATION (S)

This application is based on and claims priority under 35 U.S.C. § 119 (a) of a Korean patent application number 10-2018-0141958, filed on Nov. 16, 2018, in the Korean Intellectual Property Office, the disclosure of which is incorporated by reference herein in its entirety.

BACKGROUND

1. Field

The disclosure relates to a wireless communication system, and more particularly, to a method and an apparatus for performing feedback in a wireless communication system. More particularly, the disclosure relates to a method of transmitting information indicating decoding failure or success of uplink (UL) signals in a wireless communication system, particularly, from a system and node for receiving the UL signals or transmitting downlink (DL) signals through an unlicensed band to a system and node which desires to transmit the UL signals.

2. Description of Related Art

In order to meet explosively increasing demand with respect to wireless data traffic due to the commercialization of 4th Generation (4G) communication systems and the increase in multimedia services, pre-5th Generation (5G) communication systems or advanced 5G communication systems have been developed. For this reason, 5G communication systems or pre-5G communication systems are called beyond 4G network communication systems or post long term evolution (LTE) systems.

To increase data rates, implementation of 5G communication systems in an ultra-high frequency or millimeter-wave (mmWave) band (e.g., a 60-gigahertz (GHz) band) is considered. To reduce path loss and increase a transmission distance in the ultra-high frequency band for 5G communication systems, various technologies, such as beamforming, massive multiple input multiple output (massive MIMO), full dimensional MIMO (FD-MIMO), array antennas, analog beamforming, and large scale antennas are being studied.

To improve system network performance for 5G communication systems, various technologies, such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies, such as hybrid frequency shift keying (FSK) and quadrature amplitude modulation (QAM) (FQAM) and sliding window superposition coding (SWSC) and advanced access technologies, such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements, such as objects exchange information with each other to process the information. Internet of everything (IoE) technology, in which the IoT technology is combined with, for example, technology for processing big data through connection with a cloud server, is being newly provided. Various technological elements, such as a sensing technology, wired/wireless communication and network infrastructures, a service interface technology, and a security technology are required to implement the IoT and thus, in recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects and thus to create new value in human life. As existing information technology (IT) and various industries converge and combine with each other, the IoT may be applied to various fields, such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using 5G communication technology including beamforming, MIMO, array antennas, etc. Application of a cloud RAN as the above-described big data processing technology may be an example of convergence of the 5G communication technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a hybrid automatic repeat request (HARQ)-acknowledgements (ACK) feedback method and an apparatus in a wireless communication system. More particularly, provided are a method and an apparatus for transmitting feedback including decoding failure or success information on uplink (UL) signals, from a system and node for receiving the UL signals or transmitting downlink (DL) signals through an unlicensed band to a system and node which desires to transmit the UL signals.

Additional aspects will be set forth in part in the description which follows and, in part, will be apparent from the description, or may be learned by practice of the presented embodiments.

In accordance with an aspect of the disclosure, a method of performing, by a base station, communication in a wireless communication system is provided. The method includes obtaining feedback configuration information of a HARQ process for performing a feedback, in a unit of code block group (CBG), on a result of decoding, comparing a size of a bitmap required for the feedback in the unit of CBG with a size of an available bitmap of the base station, and transmitting feedback information in which a number of bits are restricted according to a preset method, when the size of the bitmap required for the feedback is greater than the size of the available bitmap.

In accordance with another aspect of the disclosure, a method of performing, by a user equipment, communication in a wireless communication system is provided. The method includes receiving feedback configuration information of a HARQ process for performing a feedback, in a unit of CBG, on a result of decoding, comparing a size of a bitmap required for the feedback in the unit of CBG with a size of an available bitmap of a base station based on the received feedback configuration information, obtaining information regarding at least one HARQ process in which a number of bits are restricted according to a preset method, when the size of the bitmap required for the feedback is greater than the size of the available bitmap, and decoding received feedback information based on the obtained information.

In accordance with another aspect of the disclosure, a base station for performing communication in a wireless communication system is provided. The base station includes a transceiver and a processor coupled with the transceiver and configured to obtain feedback configuration information of a HARQ process for performing a feedback, in a unit of CBG, on a result of decoding, compare a size of a bitmap required for the feedback in the unit of CBG with a size of an available bitmap of the base station, and control the transceiver to transmit feedback information in which a number of bits are restricted according to a preset method, when the size of the bitmap required for the feedback is greater than the size of the available bitmap.

In accordance with another aspect of the disclosure, a user equipment (UE) for performing communication in a wireless communication system is provided. The UE includes a transceiver and a processor coupled with the transceiver and configured to control the transceiver to receive feedback configuration information of a HARQ process for performing a feedback, in a unit of CBG, on a result of decoding, compare a size of a bitmap required for the feedback in the unit of CBG with a size of an available bitmap of a base station based on the received feedback configuration information, obtain information regarding at least one HARQ process in which a number of bits are restricted according to a preset method, when the size of the bitmap required for the feedback is greater than the size of the available bitmap, and decode received feedback information based on the obtained information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating a method, performed by a base station, of transmitting feedback by reducing a number of bits used for a codeblock group (CBG)-based hybrid automatic repeat request (HARQ)-acknowledgements (ACK) bitmap according to an embodiment of the disclosure;

FIG. 6 is a diagram illustrating a method, performed by a base station, of transmitting feedback by reducing a number of bits used for a CBG-based HARQ-ACK bitmap according to an embodiment of the disclosure;

FIG. 8 is a diagram illustrating a method, performed by a base station, of transmitting feedback by reducing a number of bits used for a CBG-based HARQ-ACK bitmap according to an embodiment of the disclosure;

Throughout the drawings, it should be noted that like reference numbers are used to depict the same or similar elements, features, and structures.

DETAILED DESCRIPTION

Figure 1:
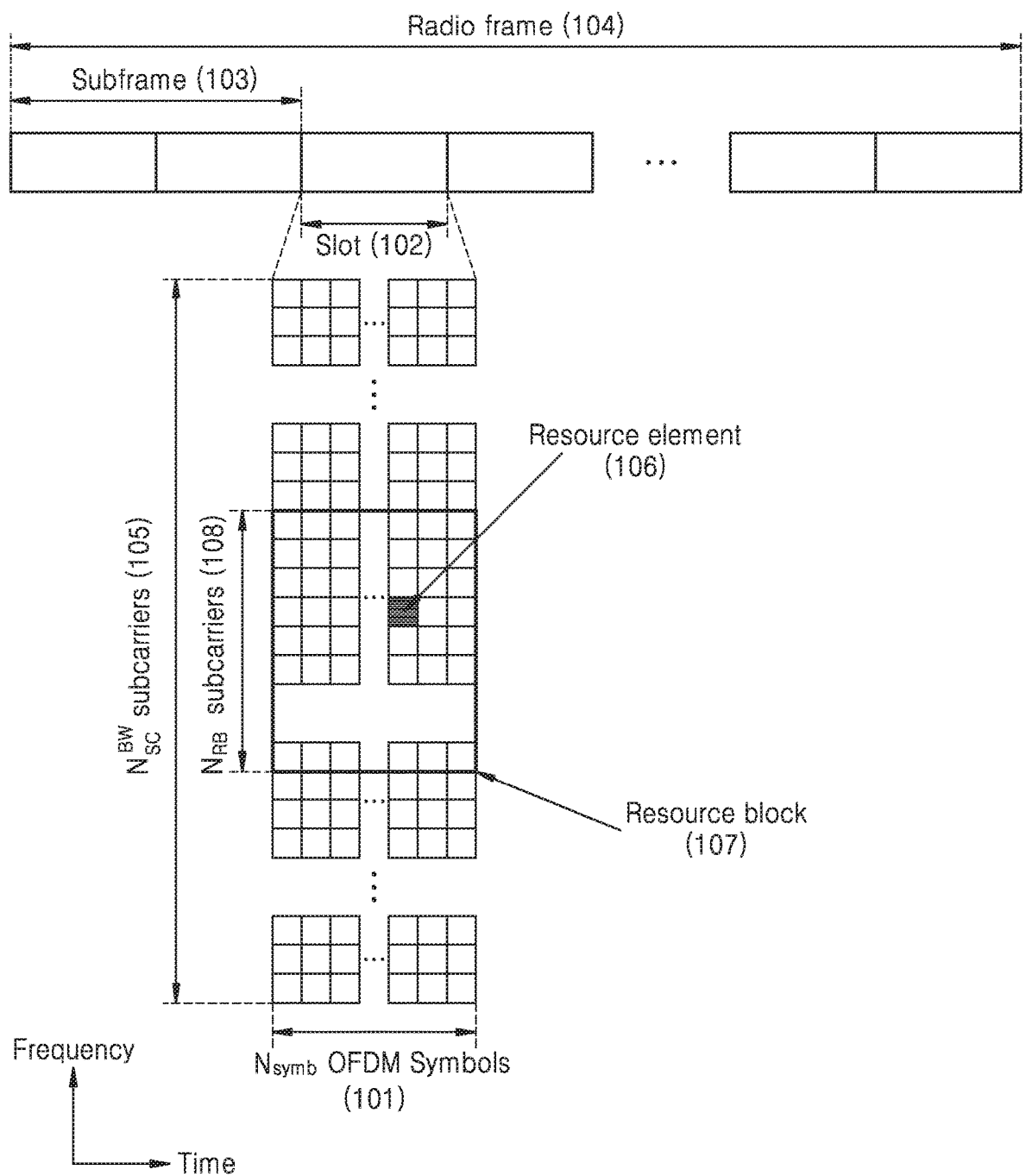
FIG. 1 is a diagram illustrating an uplink (UL)/downlink (DL) time-frequency domain transmission structure of a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

One or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein, rather, these embodiments of the disclosure are provided so that this disclosure will be thorough and complete and will fully convey the concept of the disclosure to one of ordinary skill in the art, and the disclosure will only be defined by the appended claims. Throughout the disclosure, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In embodiments of the disclosure, a controller may also be referred to as a processor.

Throughout the specification, a layer (or a layer apparatus) may also be referred to as an entity.

Hereinafter, embodiments of the disclosure will be described with reference to the attached drawings.

While describing embodiments of the disclosure, technical content that is well-known in the art and not directly related to the disclosure will not be provided. By omitting redundant descriptions, the essence of the disclosure will not be obscured and may be clearly explained.

For the same reasons, some components may be exaggerated, omitted, or schematically illustrated in drawings. The size of each component does not completely reflect the actual size thereof. In the drawings, like reference numerals denote like elements.

One or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein, rather, these embodiments of the disclosure are provided so that this disclosure will be thorough and complete and will fully convey the concept of the disclosure to one of ordinary skill in the art, and the disclosure will only be defined by the appended claims. Throughout the disclosure, like reference numerals denote like elements.

It will be understood that blocks of flowcharts and combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

As used herein, the term "unit" means a software component or hardware component, such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more Central Processing Units (CPUs) in a device or security multimedia card. As used herein, the "unit" may include at least one processor.

Support of various services is considered for 5G systems compared to existing 4G systems. Representative examples of such services include enhanced mobile broadband (eMBB), ultra-reliable and low-latency communication (URLLC), massive machine-type communication (mMTC), and evolved multimedia broadcast/multicast service (eM-BMS). In the following description, for example, a system for providing the URLLC service may be called a URLLC system, and a system for providing the eMBB service may be called an eMBB system. The terms "service" and "system" may be used interchangeably.

A communication system may provide a plurality of services to a user, and thus, a method and an apparatus capable of appropriately providing the plurality of services to the user within the same time interval may be required.

In a wireless communication system, e.g., a long term evolution (LTE) or LTE-advanced (LTE-A) system or a 5G new radio (or next radio) (NR) system, downlink control information (DCI) including assignment information of resources for transmitting downlink (DL) signals from a base station to a UE may be transmitted through a physical downlink control channel (PDCCH).

The base station may direct the UE to receive at least one DL signal from among downlink control information (e.g., a channel-state information reference signal (CSI-RS)), a physical broadcast channel (PBCH), and a physical downlink shared channel (PDSCH)), by using the DCI. For example, the base station may transmit DCI through a PDCCH in a subframe n to direct the UE to receive a PDSCH in the subframe n. The UE having received the DCI may receive the PDSCH in the subframe n based on the received DCI.

In an LTE, LTE-A, or NR system, the base station may transmit DCI including uplink (UL) resource assignment information through a PDCCH to the UE to direct the UE to transmit at least one UL signal from among uplink control information (e.g., a sounding reference signal (SRS), an uplink control information (UCI), or a physical random access channel (PRACH)) or a physical uplink shared channel (PUSCH) to the base station. For example, the UE having received UL transmission configuration information (or UL DCI or a UL grant) in a subframe n from the base station through a PDCCH may transmit a PUSCH based on a pre-defined time (e.g., n+4), a time configured through higher layer signaling (e.g., n+k), or UL signal transmission time indicator information included in UL transmission configuration information (e.g., n+k).

When configured DL transmission is performed through an unlicensed band from the base station to the UE, or when configured UL transmission is performed through an unlicensed band from the UE to the base station, a transmission device (i.e., the base station or the UE) may perform a channel access procedure (or a listen before talk (LBT) procedure) in the unlicensed band configured to transmit signals therethrough, before or immediately before a configured signal transmission start timing.

Upon determining that the unlicensed band is idle, based on the result of the channel access procedure, the transmission device may access the unlicensed band and transmit configured signals. Upon determining that the unlicensed band is not idle or is occupied, based on the result of the channel access procedure performed by the transmission device, the transmission device may not access the unlicensed band and thus may not transmit configured signals.

In the channel access procedure in the unlicensed band, generally, the transmission device may determine whether the unlicensed band is idle, by comparing an intensity of signals received through the unlicensed band for a certain time or a time calculated based on pre-defined rules (e.g., a time calculated based on one random value selected by at least the base station or the UE), with a pre-defined threshold or a threshold calculated based on a function including at least one parameter from among a channel bandwidth, a signal bandwidth for transmitting signals to be transmitted, an intensity of transmit power, and a beamwidth of transmitted signals. For example, when an intensity of signals received by the transmission device for X μs (e.g., 25 μs) is less than a pre-defined threshold T (e.g., −72 dBm), the transmission device may determine that the unlicensed band is idle, and transmit configured signals. In this case, a maximum time available to transmit signals may be limited based on a maximum channel occupancy time (MCOT) defined for an unlicensed band per country or region, or a device type of the transmission device (e.g., a base station, a UE, a master device, or a slave device). For example, in Japan, a base station or a UE may perform a channel access procedure in a 5-GHz unlicensed band, and then occupy a channel and transmit signals for up to 4 millisecond (ms) without performing an additional channel access procedure. When the intensity of the signals received for 25 microsecond (μs) is greater than the pre-defined threshold T (e.g., −72 decibel-milliwatts (dBm)), the base station may determine that the unlicensed band is not idle, and may not transmit signals.

To provide various services and support a high data rate, 5G communication systems adopt various technologies, such as a codeblock group (CBG)-based retransmission technology and a technology for transmitting UL signals without UL scheduling information. Therefore, when 5G communication is to be performed through an unlicensed band, an efficient channel access procedure considering various parameters is required.

Wireless communication systems providing voice-based services are being developed to broadband wireless communication systems providing high-speed and high-quality packet data services according to communication standards, such as high speed packet access (HSPA), long term evolution (LTE) or evolved universal terrestrial radio access (E-UTRA), and LTE-advanced (LTE-A) of 3rd generation partnership project (3GPP), high rate packet data (HRPD) and ultra-mobile broadband (UMB) of 3GPP2, and 802.16e of the Institute of Electrical and Electronics Engineers (IEEE). In addition, 5G or new radio (NR) communication standards are being made for 5th-generation wireless communication systems.

Wireless communication systems including 5th-generation communication systems may provide at least one service from among enhanced mobile broadband (eMBB), massive machine-type communication (mMTC), and ultra-reliable and low-latency communication (URLLC) to UEs. The above-mentioned services may be provided to the same UE during the same time interval. As used herein, eMBB may be aimed for high-speed transmission of high-capacity data, mMTC may be aimed for UE power minimization and access of multiple UEs, URLLC may be aimed for high reliability and low latency, but these services are not limited thereto. The above-mentioned three services may serve as critical scenarios in LTE systems or post LTE systems (e.g., 5G/NR systems).

When the base station schedules eMBB data for a certain UE in a specific transmission time interval (TTI), and when URLLC data needs to be transmitted in the scheduled TTI, a part of the eMBB data may not be transmitted and the URLLC data may be transmitted in the frequency band scheduled for the eMBB data and being used to transmit the eMBB data. Herein, the UE scheduled for the eMBB data and the UE scheduled for the URLLC data may be the same UE or different UEs. In this case, a part of the eMBB data that is already scheduled and being transmitted may not be transmitted and thus a probability of loss of the eMBB data may be increased. Therefore, in this case, a method of processing received signals or a method of receiving signals needs to be determined for the UE scheduled for the eMBB data or the UE scheduled for the URLLC data.

Hereinafter, embodiments of the disclosure will be described with reference to the attached drawings. In the following description, a detailed description of known functions and configurations incorporated herein will be omitted when it may make the subject matter of the disclosure unclear. The terms used herein are defined considering functions in the disclosure, and can be changed according to the customs or intents of users or operators. Accordingly, definitions of the terms should be understood based on the entire description of the disclosure. As used herein, a base station is an entity for assigning resources to a UE, and examples thereof may include at least one of an eNode B, a Node B, a base station (BS), a wireless access unit, a base station controller, or a network node. Examples of a terminal may include a user equipment (UE), a mobile station (MS), a cellular phone, a smartphone, a computer, a multimedia system capable of performing a communication function, or the like. As used herein, a downlink (DL) refers to a wireless transmission path of signals transmitted from a base station to a UE, and an uplink (UL) refers to a wireless transmission path of signals transmitted from the UE to the base station. Although embodiments of the disclosure will be described based on LTE or LTE-A systems, the embodiments of the disclosure may also be applied to other communication systems having similar technical backgrounds or channel types. For example, such communication systems may include 5th-generation mobile communication systems (e.g., 5G or NR systems) developed after LTE-A. Furthermore, the embodiments of the disclosure may also be applied to other communication systems through partial modification without greatly departing from the scope of the disclosure based on the judgement of one of ordinary skill in the art.

As a representative example of broadband wireless communication systems, NR systems employ orthogonal frequency-division multiplexing (OFDM) on DL, and employ both of OFDM and single-carrier frequency-division multiple access (SC-FDMA) on UL. The UL refers to a radio link for transmitting data or control signals from a terminal, a user equipment (UE), or a mobile station (MS) to an eNode B or a base station (BS), and the DL refers to a radio link for transmitting data or control signals from the eNode B or the BS to the terminal, the UE, or the MS. The above-described dual connectivity schemes distinguish between data or control information of different users by assigning and using time-frequency resources for the data or control information of the users not to overlap each other, i.e., to achieve orthogonality therebetween.

The NR systems employ a hybrid automatic repeat request (HARQ) scheme for retransmitting data from a physical layer when decoding failure occurs at initial transmission. The HARQ scheme is a scheme by which, when a receiver has not accurately decoded data, the receiver may transmit information indicating decoding failure (i.e., negative acknowledgement (NACK)), to a transmitter and thus a physical layer of the transmitter may retransmit the data. The receiver may increase data reception performance by combining the data retransmitted from the transmitter, with the previous data failed to be decoded. When the receiver has accurately decoded the data, the receiver may transmit information indicating decoding success (i.e., acknowledgement (ACK)), to the transmitter and thus the transmitter may transmit new data.

FIG. 1 is a diagram illustrating a basic structure of the time-frequency domain corresponding to a radio resource region for uplink (UL)/downlink (DL) data or control channel transmission in a new radio (NR) system or a system similar to the NR system according to an embodiment of the disclosure.

Referring to FIG. 1, a horizontal axis indicates the time domain, and a vertical axis indicates the frequency domain. The smallest transmission unit in the time domain is an orthogonal frequency-division multiplexing (OFDM) or discrete Fourier transform-spread OFDM (DFT-s-OFDM) symbol, and $N_{symb}$ OFDM or DFT-s-OFDM symbols 101 may constitute one slot 102. Herein, the OFDM symbols represent symbols for signal transmission and reception using OFDM multiplexing, and the DFT-s-OFDM symbols represent symbols for signal transmission and reception using DFT-s-OFDM or single-carrier frequency-division multiple access (SC-FDMA) multiplexing. OFDM symbols will be representatively described below without distinguishing between OFDM and DFT-s-OFDM symbols for convenience of explanation, and embodiments of the disclosure described below based on DL signal transmission and reception may also be applied to UL signal transmission and reception.

When a subcarrier spacing is 15 kHz, one slot constitutes one subframe 103, and a slot length and a subframe length are equally 1 ms. In this case, the number and the length of slots constituting one subframe 103 may vary depending on the subcarrier spacing. For example, when the subcarrier spacing is 30 kHz, 4 slots may constitute one subframe 103. In this case, the slot length is 0.5 ms and the subframe length is 1 ms.

A radio frame 104 is a time domain duration including 10 subframes. The smallest transmission unit in the frequency domain is a subcarrier, and a total system transmission bandwidth may include a total of $N_{sc}^{BW}$ subcarriers 105. The above-mentioned numerical values may be variably applied. For example, in a long term evolution (LTE) system, when the subcarrier spacing is 15 kilohertz (kHz), 2 slots constitute one subframe 103 and, in this case, the slot length is 0.5 ms and the subframe length is 1 ms.

A basic unit of resource in the time-frequency domain is a resource element (RE) 106 which may be identified by an OFDM symbol index and a subcarrier index. A resource block (RB) (or a physical resource block (PRB)) 107 may be defined as consecutive $N_{symb}$ OFDM symbols 101 in the time domain and consecutive $N_{sc}^{RB}$ subcarriers 108 in the frequency domain. Therefore, one RB 107 in one slot may include $N_{symb} \times N_{sc}^{RB}$ REs.

In general, the smallest frequency domain data assignment unit is the RB 107. In the NR system, generally, $N_{symb}=14$, $N_{sc}^{RB}=12$, and the number of RBs (NRB) may vary depending on a system transmission bandwidth. In the LTE system, generally, $N_{symb}=7$, $N_{sc}^{RB}=12$, and the NRB may vary depending on a system transmission bandwidth.

Downlink control information (DCI) may be transmitted within initial N OFDM symbols in a subframe. In general, N={1, 2, 3} and a base station may configure the number of symbols usable to transmit DCI, for a UE through higher layer signaling. The base station may vary the number of symbols usable to transmit DCI, per slot depending on the size of DCI to be transmitted in a current slot, and transmit information about the number of symbols to the UE through a physical downlink control channel (PDCCH).

In the NR or LTE system, DL or UL data scheduling information may be transmitted as DCI from the base station to the UE. The DCI is defined in various formats, and each format may indicate, for example, whether the DCI includes UL data scheduling information (i.e., a UL grant) or DL data scheduling information (i.e., a DL grant), whether the DCI is compact DCI having a small size, whether the DCI is fall-back DCI, whether spatial multiplexing using multiple antennas is applicable, or whether the DCI is power control DCI. For example, a DCI format indicating DL data scheduling information (i.e., a DL grant) (e.g., DCI format 1_0 of the NR system) may include at least one of various types of control information described below.

A DCI format identifier: it is an identifier for identifying a format of received DCI.

Frequency domain resource assignment: it indicates RBs assigned for data transmission.

Time domain resource assignment: it indicates a slot and symbols assigned for data transmission.

Virtual resource block (VRB)-to-Physical resource block (PRB) mapping: it indicates whether VRB mapping is applied.

Modulation and coding scheme (MCS): it indicates a modulation scheme used for data transmission, and the size of a transport block to be transmitted.

New data indicator: it indicates initial transmission or retransmission of hybrid automatic repeat request (HARQ).

Redundancy version: it indicates a redundancy version of HARQ.

HARQ process number: it indicates a process number of HARQ.

Downlink assignment index: it indicates, for a UE, the number of physical downlink shared channel (PDSCH) reception results (e.g., the number of HARQ-acknowledgements (ACKs)) to be reported to a base station.

Transmit power control (TPC) command for physical uplink control channel (PUCCH): it indicates a TCP command for a PUCCH.

PUCCH resource indicator: it indicates PUCCH resources used for HARQ-ACK reports including reception results on PDSCH configured using the DCI.

PDSCH-to-HARQ_feedback timing indicator: it indicates information about a slot or symbols used to transmit PUCCH for HARQ-ACK reports including reception results on PDSCH configured using the DCI.

The DCI may be channel-coded and modulated and then be transmitted on a PDCCH (hereinafter also referred to as control information) or an enhanced PDCCH (EPDCCH) (hereinafter also referred to as enhanced control information).

In general, the DCI may be scrambled with a UE-specific radio network temporary identifier (RNTI) and added with a cyclic redundancy check (CRC), be channel-coded, and then be configured and transmitted as an independent PDCCH. In the time domain, the PDCCH may be mapped and transmitted for a control channel transmission duration. The PDCCH may be mapped to a frequency domain location determined based on an identity (ID) of each UE, and be transmitted over a total system transmission bandwidth.

DL data may be transmitted on a PDSCH. The PDSCH may be transmitted after the control channel transmission duration, and scheduling information thereof, e.g., a frequency domain mapping location and a modulation scheme, may be determined based on the DCI transmitted through the PDCCH.

By using the MCS included in the DCI, the base station may inform the UE of a modulation scheme applied to the PDSCH to be transmitted, and the size of data to be transmitted (e.g., a transport block size (TBS)). In an embodiment of the disclosure, the MCS may include 5 or more or less bits. The TBS corresponds to the size of the data (e.g., a transport block (TB)) to be transmitted from the base station before the data is channel-coded for error correction.

Herein, the TB may include a medium access control (MAC) header, a MAC control element (CE), one or more MAC service data units (SDUs), and padding bits. According to another example, the TB may indicate a unit of data transmitted from a MAC layer down to a physical layer, or a MAC protocol data unit (PDU).

Modulation schemes supported by the NR system include quadrature phase shift keying (QPSK), 16 quadrature amplitude modulation (QAM), 64QAM, and 256QAM, and modulation orders Qm thereof are respectively 2, 4, 6, and 8. For example, QPSK modulation may transmit 2 bits per symbol, 16QAM modulation may transmit 4 bits per symbol, 64QAM modulation may transmit 6 bits per symbol, and 256QAM modulation may transmit 8 bits per symbol. Modulation schemes higher than 256QAM may also be used based on system modification.

In the NR system, asynchronous HARQ by which a data retransmission timing is not fixed is adopted for UL/DL HARQ. For example, on DL, when HARQ negative acknowledgements (NACKs) on data initially transmitted from the base station are fed back from the UE, the base station may freely determine a retransmission timing of the data based on a scheduling operation. For a HARQ operation, the UE may buffer data determined as an error as a result of decoding the received data, and then combine the buffered data with data retransmitted from the base station.

HARQ ACK/NACK information on PDSCH transmitted in a subframe n−k may be transmitted in a subframe n from the UE to the base station through a PUCCH or a physical uplink shared channel (PUSCH). In a 5G communication system, such as the NR system, the value k may be included and transmitted in DCI for directing to receive or for scheduling the PDSCH transmitted in the subframe n−k, or be configured for the UE by using a higher layer signal. In this case, the base station may configure one or more values k by using a higher layer signal, and signal a specific value k by using DCI. In this case, k may be determined based on a HARQ-ACK processing capability of the UE, i.e., the shortest time taken from when the UE receives the PDSCH until when the UE generates and reports HARQ-ACKs on the PDSCH. Before the value k is configured, the UE may use a pre-defined value or a default value.

In the NR system, one TB to be transmitted on UL or DL may be added with a CRC at the tail or head thereof. The CRC may have 16 bits, 24 bits, a previously fixed number of bits, or a variable number of bits depending on a channel state or the like, and be used to determine whether channel coding is succeeded. The TB and the CRC-added block may be split into a plurality of codeblocks (CBs). A maximum CB size may be previously determined and, in this case, the last CB may be smaller in size than the other CBs. When the last CB is smaller in size than the other CBs, a value 0, a random value, or a value 1 may be added to match the length thereof with the other CBs. A CRC may be added to each of the split CBs, have 16 bits, 24 bits, or a previously fixed number of bits, and be used to determine whether channel coding is succeeded. In this case, to increase retransmission efficiency, the NR system may decode each CB and determine transmission success or failure thereof instead of determining transmission success or failure in units of a TB. Decoding results of CBs may be bundled in units of a codeblock group (CBG) and be transmitted as ACK or NACK. A maximum CBG size may be determined as a value configured by a higher layer, and be equally applied to all HARQ process numbers.

Although the above description is provided based on the NR system to describe a wireless communication system and a method and an apparatus according to embodiments of the disclosure, the disclosure is not limited to the NR system and may also be applied to various wireless communication systems, such as LTE, LTE-A, LTE-A-Pro, and 5G systems. Although the following description will be provided based on a system and device for transmitting and receiving signals by using an unlicensed band, the disclosure may also be applied to a system operating in a licensed band.

In the following description, higher layer signaling or a higher layer signal may refer to a method of transmitting signals from a base station to a UE by using a PDSCH of a physical layer, or from the UE to the base station by using a PUSCH of a physical layer, and include radio resource control (RRC) signaling, PDCP signaling, or signaling using a MAC CE. The higher layer signaling or the higher layer signal may include system information commonly transmitted to a plurality of UEs, e.g., a system information block (SIB).

In a system for performing communication in an unlicensed band, a transmission device (e.g., a base station or a UE) which desires to transmit signals through an unlicensed band may perform a channel access procedure (or a listen before talk (LBT) procedure) in the unlicensed band to be used for communication, before the signals are transmitted, and then access the unlicensed band and transmit the signals upon determining that the unlicensed band is idle, based on the channel access procedure. Upon determining that the unlicensed band is not idle, based on the channel access procedure, the transmission device may not transmit the signals.

In the channel access procedure in the unlicensed band, generally, the transmission device may determine whether the unlicensed band is idle, by measuring an intensity of signals received through the unlicensed band for a certain time or a time calculated based on pre-defined rules (e.g., a time calculated based on one random value selected by at least the base station or the UE), and comparing the measured intensity with a pre-defined threshold or a threshold calculated based on a received signal intensity determination function including one or more parameters, such as a channel bandwidth, a signal bandwidth for transmitting signals to be transmitted, and an intensity of transmit power.

More specifically, when the base station or the UE desires to transmit DL or UL signals through the unlicensed band, the channel access procedure which may be performed by the base station or the UE may include at least types described below.

Type 1: A channel access procedure is performed for a variable time and then UL/DL signals are transmitted.

Type 2: A channel access procedure is performed for a fixed time and then UL/DL signals are transmitted.

Type 3: UL/DL signals are transmitted without performing a channel access procedure.

Although a case in which a base station transmits DL signals to a UE through an unlicensed band and a case in which the UE transmits UL signals to the base station through an unlicensed band will be separately described below, the disclosure may be equally applied or partially modified and applied to a case in which the UE transmits UL signals to the base station through an unlicensed band and a case in which the base station transmits DL signals to the UE through an unlicensed band. Therefore, a detailed description of DL signal transmission and reception will not be provided herein. The following description assumes that one DL data (codewords or TBs) or UL data is transmitted and received between a base station and a UE. However, the disclosure may also be applied to a case in which a base station transmits DL signals to a plurality of UEs or a case in which a plurality of codewords or TBs are transmitted and received between a base station and a UE.

A transmission node (hereinafter referred to as a base station or a UE) which desires to transmit signals through an unlicensed band may determine a type of a channel access procedure based on the type of the signals to be transmitted. For example, when the base station desires to transmit DL signals including PDSCH, through the unlicensed band, the base station may perform a channel access procedure of Type 1. When the base station desires to transmit DL signals not including PDSCH, e.g., synchronization signals or PDCCH, through the unlicensed band, the base station may perform a channel access procedure of Type 2 and transmit the DL signals.

In this case, the type of the channel access procedure may also be determined based on a transmission length of the signals to be transmitted through the unlicensed band, or a length of a time or a duration for occupying and using the unlicensed band. In general, the channel access procedure of Type 1 may be performed for a long time compared to the channel access procedure of Type 2. Therefore, when the signals are to be transmitted for a short time duration or a time equal to or shorter than a reference time (e.g., X ms or Y symbols), the channel access procedure of Type 2 may be performed. Otherwise, when the signals are to be transmitted for a long time duration or a time longer than the reference time (e.g., X ms or Y symbols), the channel access procedure of Type 1 may be performed. For example, a channel access procedure of a different type may be performed depending on a time for using the unlicensed band.

When the channel access procedure of Type 1 is performed based on at least one of the above-described criteria, a channel access priority class may be determined based on a quality of service class identifier (QCI) of the signals to be transmitted through the unlicensed band, and the channel access procedure may be performed using at least one of configuration values pre-defined as shown in Table 1 for the determined channel access priority class. For example, QCI values 1, 2, and 4 respectively refer to QCI values for services, such as conversational voice, conversational video (live streaming), and non-conversational video (buffered streaming) When signals for a service not matching any QCI of Table 1 are to be transmitted through the unlicensed band, a QCI of Table 1 which is the closest to a QCI of the service may be selected and a channel access priority class therefor may be selected.

Table 1 shows mapping between channel access priority classes and QCI.

TABLE 1

Mapping between Channel Access Priority Classes and QCI

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

For example, a defer duration, a set of contention window values or sizes CW_p, a minimum contention window value CW_min,p and a maximum contention window value CW_max,p, and a maximum channel occupancy time T_mcot,p based or a determined channel access priority p may be determined as shown in Table 2. For example, the base station which desires to transmit the DL signals through the unlicensed band may perform the channel access procedure in the unlicensed band at least for a time T_f+m_p*T_sl.

When the channel access procedure is to be performed based on a channel access priority class 3 (p=3), a length T_f+m_p*T_sl of a defer duration required to perform the channel access procedure may be configured using m_p=3. Upon determining that the unlicensed band is idle continuously for a time m_p*T_sl, N=N−1 may be satisfied. In this case, N may be selected as an arbitrary integer value between 0 and the contention window value CW_p at a timing at which the channel access procedure is performed. For the channel access priority class 3, the minimum contention window value and the maximum contention window value are respectively 15 and 63.

Upon determining that the unlicensed band is idle in the defer duration and an additional channel access procedure performing duration, the base station may transmit the signals through the unlicensed band for the time T_mcot,p (e.g., 8 ms). Table 2 shows channel access priority classes on DL. Although the following description will be provided using DL channel access priority classes for convenience of explanation, the channel access priority classes of Table 2 may be reused or UL channel access priority classes may be defined and used for UL.

TABLE 2

Channel Access Priority Class

| Channel Access Priority Class(p) | mp | CWmin,p | CWmax,p | Tmcot,p | allowed CWp sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value CW_p is the minimum contention window value CW_min,p. The base station having selected a value N as the initial contention window value may perform the channel access procedure for a time T_sl, change the value N to N=N−1 upon determining that the unlicensed band is idle, based on the channel access procedure performed for the time T_sl, and transmit the signals through the unlicensed band for the maximum channel occupancy time T_mcot,p when N=0. Upon determining that the unlicensed band is not idle, based on the channel access procedure performed for the time T_sl, the base station may perform the channel access procedure again without changing the value N.

The contention window value CW_p may be changed based on reception results on PDSCH in a reference subframe or slot of a DL signal transmission duration (or a maximum channel occupancy time (MCOT)) for which transmission is most recently performed by the base station through the unlicensed band at a timing at which the base station starts the channel access procedure, a timing at which the base station selects the value N to perform the channel access procedure, or immediately before the timing. For example, the base station may be reported about reception results of the UE on DL data transmitted in the reference subframe or slot, and increase or minimize the contention window value CW_p based on a NACK ratio Z in the reported reception results.

Figure 2:
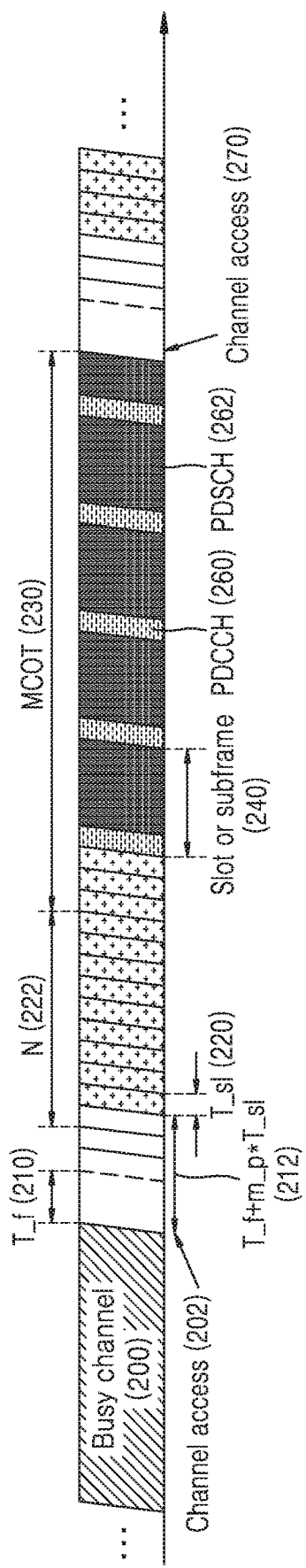
FIG. 2 is a diagram illustrating a channel access procedure in an unlicensed band according to an embodiment of the disclosure.

FIG. 2 is a diagram illustrating a channel access procedure in an unlicensed band according to an embodiment of the disclosure.

Referring to FIG. 2, a first transmission duration 240 (hereinafter referred to as a slot or subframe) of a DL signal transmission duration 230 for which transmission is most recently performed through an unlicensed band at a timing 270 at which a base station starts a channel access procedure, a timing at which the base station selects a value N to perform the channel access procedure, or immediately before the timing serves as a 222 reference slot for determining whether to change a contention window for a channel access procedure. When the base station is not reported about reception results on PDSCH 262 and PDCCH 260 transmitted in the first slot 240 of the DL signal transmission duration 230, for example, when a time interval between the first subframe 240 and the timing 270 at which the base station starts the channel access procedure is equal to or less than n slots or subframes, that is, when the base station starts the channel access procedure before a timing at which a UE may report reception results on PDSCH 262 transmitted in the first subframe 240, a first subframe of a DL signal transmission duration for which transmission is most recently performed before the DL signal transmission duration 230 serves as a reference subframe. For example, when reception results on DL data transmitted in the reference subframe 240 are not received from the UE at the timing 270 at which the base station starts the channel access procedure 202, the timing at which the base station selects the value N 222 to perform the channel access procedure 202, or immediately before the timing, the base station may determine a first subframe of a DL signal transmission duration 210 for which transmission is most recently performed from among PDSCH 262 reception results previously received from UEs, as a reference subframe. The base station may determine a contention window size used in the channel access procedure 270, by using reception results received from the UEs on DL data transmitted through the PDSCH 262 in the reference subframe.

For example, upon determining that 80% or a higher ratio of reception results of the UE on the DL data transmitted to the UE through the PDSCH 262 in the first subframe from among the DL signals transmitted through the unlicensed band are NACKs, the base station having transmitted the DL signals based on a channel access procedure (e.g., CW_p=15) configured using a channel access priority class 3 (p=3) may increase an initial contention window value (CW_p=15) to a next contention window value (CW_p=31).

Upon not determining that 80% or a higher ratio of the reception results of the UE are NACKs, the base station may maintain the contention window value or change the contention window value to the initial contention window value. In this case, the changing of the contention window may be commonly applied to all channel access priority classes, or be applied to only the channel access priority class used in the channel access procedure. In this case, in the reference subframe or slot for determining whether to change the contention window size, a method of determining reception results valid to determine whether to change the contention window size, from among the reception results transmitted or reported from the UE to the base station on the DL data transmitted through the PDSCH 262, i.e., a method of determining a value Z, is described below.

When the base station transmits one or more codewords or TBs to one or more UEs in the reference subframe or slot, the base station may determine the value Z as a NACK ratio in reception results transmitted or reported from the UE on the TBs received in the reference subframe or slot. For example, when 2 codewords or TBs are transmitted to one UE in the reference subframe or slot, the base station receives or is reported about DL data reception results on the 2 TBs from the UE. When the NACK ratio Z in the reception results on the 2 TBs is equal to or higher than a pre-defined threshold or a threshold configured between the base station and the UE (e.g., Z=80%), the base station may change or increase the contention window size.

In this case, when the UE bundles DL data reception results on one or more subframes (e.g., M subframes) including the reference subframe or slot and transmits or reports the bundled reception result to the base station, the base station may determine that the UE has transmitted M reception results. The base station may determine the value Z as a NACK ratio in the M reception results, and change, maintain, or initialize the contention window size.

When the reference subframe corresponds to a second slot of one subframe including two slots, the value Z may be determined as a NACK ratio in reception results transmitted or reported from the UE to the base station on DL data received in the reference subframe (i.e., the second slot) and a next subframe.

When PDSCH 262 scheduling information or DCI transmitted from the base station is transmitted in a cell or frequency band the same as the cell or frequency band for transmitting the PDSCH 262, or when the PDSCH 262 scheduling information or the DCI transmitted from the base station is transmitted through the unlicensed band but in a cell or frequency band different from the cell or frequency band for transmitting the PDSCH 262, and when the base station determines that the UE does not transmit reception results on DL data received in the reference subframe or slot, and when the reception results transmitted from the UE on the DL data include reception results determined as discontinuous transmission (DTX), NACK/DTX, or any state, the base station may determine the reception results of the UE as NACKs to determine the value Z.

When the PDSCH 262 scheduling information or the DCI transmitted from the base station is transmitted through the unlicensed band, and when the reception results transmitted from the UE on the DL data include reception results determined as DTX, NACK/DTX, or any state, the base station may not include the reception results of the UE in the value Z serving as a reference value for determining whether to change the contention window. For example, the base station may determine the value Z by ignoring the reception results of the UE.

When the base station transmits the PDSCH 262 scheduling information or the DCI through a licensed band, and when the reception results transmitted or reported from the UE to the base station on the reference subframe or slot include reception results determined as no transmission indicating that no DL data is transmitted from the base station, the base station may determine the value Z by ignoring the reception results transmitted or reported from the UE on the DL data.

In a 5G system, considering various services and requirements, a frame structure needs to be flexibly defined and used. For example, different services may have different subcarrier spacings depending on requirements. Currently, Equation 1 may be used to support a plurality of subcarrier spacings in the 5G communication system.

$$f = f_0 2^m \quad \text{Equation 1}$$

In Equation 1, $f_0$ denotes a basic subcarrier spacing of a system, and m denotes an integer scaling factor. For example, when $f_0$ is 15 kHz, a set of subcarrier spacings available for the 5G communication system may include 3.75 kHz, 7.5 kHz, 15 kHz, 30 kHz, 60 kHz, 120 kHz, 240 kHz, and 480 kHz. A usable subcarrier spacing set may vary depending on a frequency band. For example, 3.75 kHz, 7.5 kHz, 15 kHz, 30 kHz, and 60 kHz may be used in a frequency band equal to or less than 6 GHz, and 60 kHz, 120 kHz, and 240 kHz may be used in a frequency band greater than 6 GHz.

Because a subcarrier spacing is in a reciprocal relationship to a length of an OFDM symbol, the length of the OFDM symbol may vary depending on the subcarrier spacing for configuring the OFDM symbol. For example, the symbol length is reduced to ½ when the subcarrier spacing is increased 2 times, and is increased 2 times when the subcarrier spacing is reduced to ½.

A resource region for data channel transmission in a 5G communication system will now be described.

Figure 3:
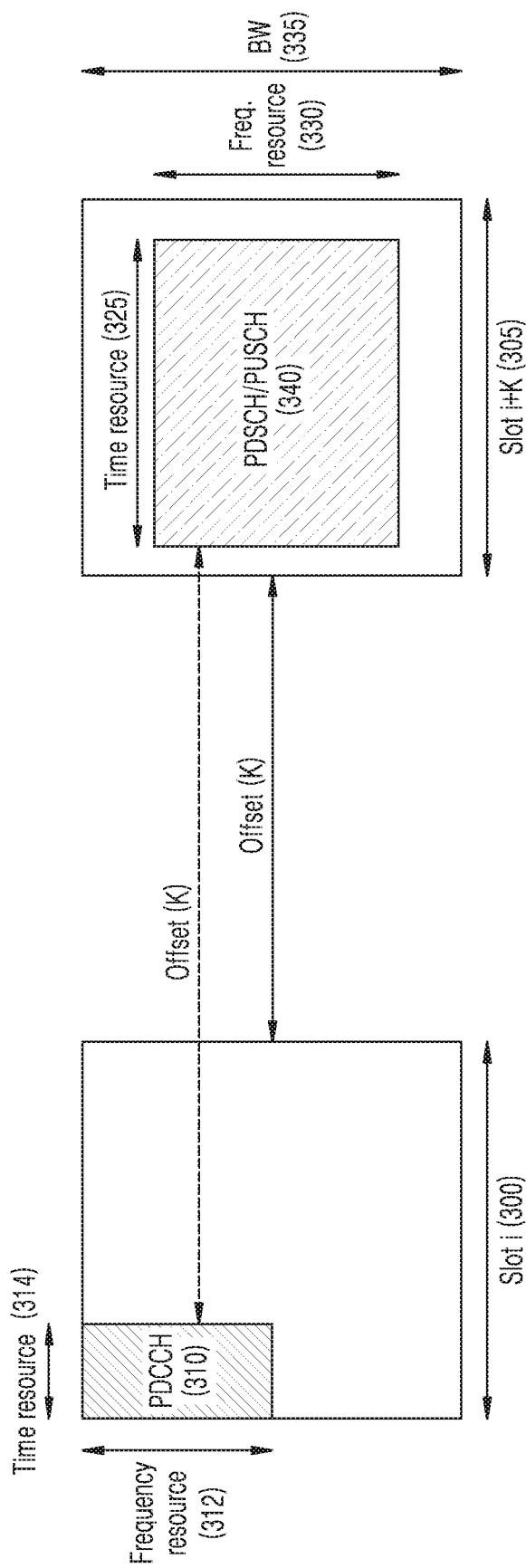
FIG. 3 is a diagram illustrating a DL or UL scheduling method and a resource region in an NR system according to an embodiment of the disclosure.

FIG. 3 is a diagram illustrating a resource region for data channel transmission in a 5G communication system according to an embodiment of the disclosure.

A UE may monitor or detect a PDCCH 310 in a PDCCH region (hereinafter also referred to as a control resource set (CORESET) or a search space (SS)) configured through higher layer signaling from a base station. In this case, the PDCCH region includes time domain information 314 and frequency domain information 312, and the time domain information 314 may be configured in units of a symbol whereas the frequency domain information 312 may be configured in units of an RB or a group of RBs. When the UE detects the PDCCH 310 in a slot i 300, the UE may obtain DCI transmitted through the detected PDCCH 310. The UE may obtain PDSCH 411 or PUSCH 406 scheduling information from the received DCI. For example, the DCI may include information about a resource region in which the UE needs to receive PDSCH transmitted from the base station (or a PDSCH transmission region), or information about a resource region assigned by the base station for the UE to transmit PUSCH. A case in which the UE receives PUSCH scheduling information will now be described as an example. The UE having received the DCI may obtain a PUSCH reception slot index or offset information K from the DCI, and thus determine a PUSCH transmission slot index. For example, the UE may determine as being scheduled to transmit PUSCH in a slot i+K 305, based on the received offset information K with respect to the slot index i 300 in which the PDCCH 310 is received. In this case, the UE may determine the slot i+K 305 or a PUSCH start symbol or time in the slot i+K 305, based on the received offset information K with respect to the CORESET in which the PDCCH 310 is received. In addition, the UE may obtain information about a PUSCH transmission time-frequency resource (420) region 340 in the PUSCH transmission slot 305, from the DCI. In this case, PUSCH transmission frequency resource region information 330 may be information configured in units of a PRB or a group of PRBs. The PUSCH transmission frequency resource region information 330 is information about a region included in an initial bandwidth (BW) 335 or an initial bandwidth part (BWP) determined by or configured for the UE through an initial access procedure. When a BW 335 or a BWP is configured for the UE through higher layer signaling, the PUSCH transmission frequency resource region information 330 is information about a region included in the BW 335 or the BWP configured through higher layer signaling.

PUSCH transmission time resource (413, 414, 415, 417, 416, 417, 418, and 419) region information 325 may be information configured in units of a symbol or a group of symbols, or information indicating absolute time information. In this case, the PUSCH transmission time resource region information 325 may be represented as a combination of a PUSCH transmission start time or symbol and a PUSCH length or a PUSCH end time or symbol and be included in the DCI as one field or value. In this case, the PUSCH transmission time resource region information 325 may also be included in the DCI as separate fields or values for representing the PUSCH transmission start time or symbol and the PUSCH length or the PUSCH end time or symbol. The UE may transmit PUSCH in the PUSCH transmission time-frequency resource region 340 determined based on the DCI.

In a 5G communication system, UL signals may be transmitted without UL scheduling information to provide various services and support a high data rate. More specifically, when UL signals are to be transmitted without UL scheduling information, information for UL transmission, such as resource assignment and MCS may be configured through RRC signaling or by using DCI of a PDCCH, and an available UL transmission method may have at least types described below based on UL transmission configuration.

Type 1: UL transmission configuration using RRC signaling

Type 2: UL transmission configuration using a PUSCH of a physical layer

Figure 4:
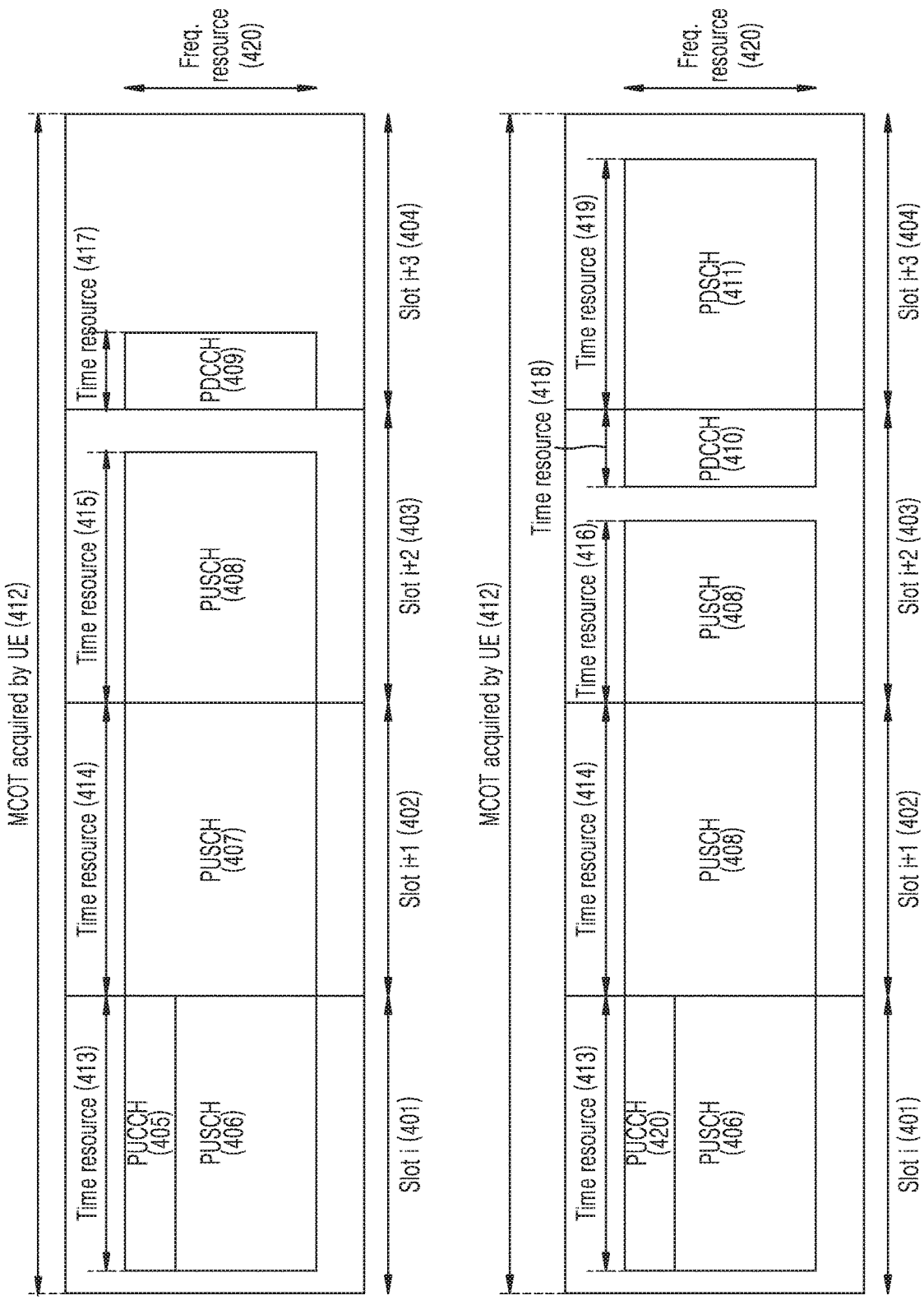
FIG. 4 is a diagram illustrating a DL or UL scheduling method and a resource region in an NR system according to an embodiment of the disclosure.

FIG. 4 is a diagram illustrating a DL or UL scheduling method and a resource region in an NR system according to an embodiment of the disclosure.

Referring to FIG. 4, in an unlicensed band, a channel access procedure may be performed to transmit UL signals without UL scheduling information. In this case, when a UE accesses an unlicensed band by performing a channel access procedure for a variable time, the UE may schedule DL transmission in a last slot or subframe 404 of slots 401, 402, 403, and 404 of a maximum channel occupancy time 412 by using a channel occupancy time sharing indicator of UL control information 405 and 420. In this case, a base station may determine channel access by performing a channel access procedure for a fixed time, and the UE may configure one last symbol of a slot or subframe 408 for UL transmission, as a gap duration for the channel access procedure of the base station. DL transmission is limited to PDCCH 409 and 410 as illustrated in an upper part of FIG. 4, and a start symbol of the PDCCH 409 and 410 is limited to a first symbol of the last slot or subframe 404 and PDCCH 409 and 410 has a symbol length within 2 symbols.

The base station may transmit decoding results on received UL signals to the UE by using a bitmap. In this case, the base station may transmit ACK/NACK information for all HARQ process numbers in the form of a bitmap, and the size of the bitmap may follow the size of DCI. Not-transmitted or empty HARQ process numbers may be configured as a default value (e.g., NACK or ACK). The NR system may transmit CBG-based decoding results instead of TB-based decoding results to increase retransmission efficiency. When CBG-based HARQ-ACK feedback is transmitted in the form of a bitmap, more bits are required compared to TB-based HARQ-ACK feedback. For example, when a higher layer configures a maximum CBG size to be 8, a 256-bit bitmap is required for CBG-based transmission for all HARQ process numbers 1 to 32. Thus, a method of transmitting a bitmap of CBG-based HARQ-ACK feedback when the number of bits usable for the bitmap is not sufficient is required.

Therefore, the disclosure proposes a method of transmitting CBG-based HARQ-ACK feedback within a limited number of bits of a bitmap usable by a base station and a UE which desire to transmit CBG-based HARQ-ACK feedback in the form of a bitmap in an unlicensed band. More particularly, the disclosure proposes a method and an apparatus capable of enabling CBG-based transmission within the number of bits of a bitmap by adjusting a CBG size based on scheduling configuration and bundling application.

The method and apparatus proposed according to embodiments of the disclosure are not limited to the embodiments of the disclosure, and may be used for a method and an apparatus for transmitting a bitmap of CBG-based HARQ-ACK feedback, by using a combination of all or some of one or more embodiments of the disclosure. Although HARQ-ACK feedback on UL signals will be described in embodiments of the disclosure, the embodiments of the disclosure may also be applied to HARQ-ACK feedback of a UE on DL signals. Embodiments of the disclosure will assume a base station and a UE operating in an unlicensed band. The method and apparatus proposed according to embodiments of the disclosure may be applied not only to a base station and a UE operating in an unlicensed band but also to a base station and a UE operating in a licensed band or a shared spectrum.

Embodiment 1 of the Disclosure

In the current embodiment of the disclosure, a method of signaling CBG transmission information for all HARQ processes by using a bitmap between a base station and a UE operating in an unlicensed band will be described. Particularly, in the current embodiment of the disclosure, a method of determining a CBG size based on scheduling configuration will be described.

The current embodiment of the disclosure assumes a UE configured to transmit PUCCH/PUSCH in a plurality of grant-free or grant-based slots. To transmit PUSCH, the UE for which grant-free transmission is configured by the base station may include HARQ process numbers in UL control signals. In this case, the HARQ process numbers used for grant-free transmission may be assigned from the base station, and also be used for grant-based transmission. The base station may transmit decoding results, i.e., ACK/NACK information, on all UL signals received from the UE, by using a bitmap. To decode TB-based UL signals, the base station may decode each CB and determine transmission success and failure thereof, and transmit decoding results of CBs as the above-described CBG-based feedback. In this case, when the number of bits of a bitmap required to transmit CBG-based HARQ-ACK feedback is greater than the number of bits usable for DCI, the base station may transmit the feedback by reducing the number of bits used for the CBG-based HARQ-ACK bitmap.

FIG. 5 is a diagram illustrating a method, performed by a base station, of transmitting feedback by reducing a number of bits used for a CBG-based HARQ-ACK bitmap according to an embodiment of the disclosure.

Referring to FIG. 5, operations according to the current embodiment of the disclosure will be described.

To transmit a bitmap of CBG-based HARQ-ACK feedback, the base station may not apply CBG-based HARQ-ACK feedback to feedback on grant-based UL signals (see reference numerals 506 and 507). For example, when the number of bits of a bitmap required to transmit CBG-based HARQ-ACK feedback is less than the number of bits usable for DCI, the base station may perform TB-based ACK/NACK feedback on grant-based UL signals. For example, the base station may perform 1-bit ACK/NACK transmission for the grant-based UL signals. In this case, a decoding result of the 1-bit ACK/NACK transmission may be also used to configure a contention window when the UE performs a channel access procedure. The base station may signal TB-based ACK/NACK feedback for grant-based HARQ-ACK feedback through 1-bit signaling. When a bitmap is configured based on TB-based ACK/NACK for grant-based HARQ-ACK feedback, and when the bitmap size is less than a maximum usable DCI size, the base station may transmit the bitmap by padding a value 0.

The UE may not expect CBG-based HARQ-ACK feedback for grant-based HARQ process numbers 503 and 504 out of HARQ process numbers 500-507. According to Embodiment 1 of the disclosure, changes of grant-free CBG-based transmission may be increased by performing TB-based ACK/NACK transmission for grant-based HARQ-ACK feedback which does not require CBG-based transmission.

Embodiment 2 of the Disclosure

In the current embodiment of the disclosure, a method of signaling CBG transmission information for all HARQ processes by using a bitmap between a base station and a UE operating in an unlicensed band will be described. Particularly, in the current embodiment of the disclosure, a method of determining a CBG size based on bundling will be described.

The current embodiment of the disclosure assumes a UE configured to transmit PUCCH/PUSCH in a plurality of grant-free or grant-based slots, and the base station may transmit the above-described bitmap of CBG-based HARQ-ACK feedback. In this case, when the number of bits of a bitmap required to transmit CBG-based HARQ-ACK feedback is less than the number of bits usable for DCI, or when the size of a bitmap used for HARQ-ACK feedback of grant-free UL signals after the method according to Embodiment 1 of the disclosure is applied is less than the number of bits usable for DCI, the base station may reduce a CBG size by using bundling. The current embodiment of the disclosure assumes that the method according to Embodiment 1 of the disclosure is previously performed. However, the assumption is merely an example for convenience of explanation, and Embodiment 2 of the disclosure may be independently used to limit the number of bits. A specific method will now be described.

Method 1: Bundling to the Same Size

Method 1 will now be described with reference to FIG. 6.

FIG. 6 is a diagram illustrating a method, performed by a base station, of transmitting feedback by reducing a number of bits used for a CBG-based HARQ-ACK bitmap according to an embodiment of the disclosure.

Referring to FIG. 6, when the number of bits required to transmit a bitmap of CBG-based HARQ-ACK feedback is greater than the number of bits usable for DCI, the base station may reduce a CBG size by using bundling. In this case, the base station may apply the same bundling size to all HARQ process numbers, and bundling size information may be signaled to the UE through bit signaling shown in Table 3. The bundling size information may be represented as a bundling unit or a CBG size. For example, when a higher layer configures a maximum CBG size as 4 bits, and when CBG-based transmission for all HARQ process numbers 1 to 5 is to be performed in the form of a bitmap, the CBG size is reduced to a value 2 (see reference numerals 606, 607, 608, and 609 out of HARQ process numbers 600-609) as illustrated in FIG. 6 by using a bundling size (or CBG size) value 2 of Table 3. Therefore, the base station may transmit CBG-based HARQ-ACK feedback for all HARQ process numbers by using a 10-bit bitmap.

When the bitmap size after bundling is applied is less than a maximum usable DCI size, the base station may transmit the bitmap by padding a value 0. The UE may receive bitmap information of CBG-based HARQ-ACK feedback by determining a CBG size per HARQ process number based on the bundling size information configured through bitmap signaling and the maximum CBG size configured from the higher layer.

According to Method 1, CBG-based HARQ-ACK feedback may be performed through bundling even when CBG-based HARQ-ACK feedback is not enabled due to lack of the number of bits of a bitmap.

TABLE 3

Bundling Size Indicator
Bundling size indicator

| Bits | Information |
|------|-------------|
| 00   | 2           |
| 01   | 3           |
| 10   | 4           |
| 11   | 8           |

Method 2: Bundling Based on a CBG Size Determination Algorithm

Method 2 will now be described with reference to FIG. 7.

Figure 7:
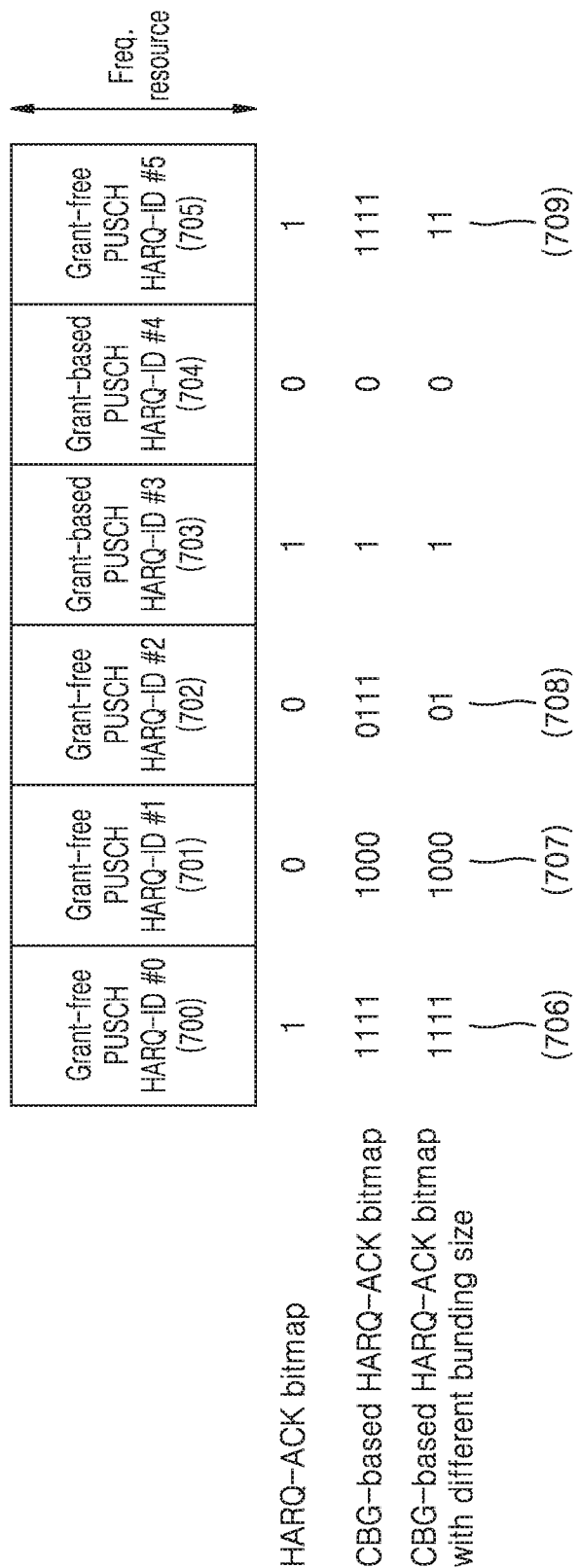
FIG. 7 is a diagram illustrating a method, performed by a base station, of transmitting feedback by reducing a number of bits used for a CBG-based HARQ-ACK bitmap according to an embodiment of the disclosure.

FIG. 7 is a diagram illustrating a method, performed by a base station, of transmitting feedback by reducing a number of bits used for a CBG-based HARQ-ACK bitmap according to an embodiment of the disclosure.

Referring to FIG. 7, method 2 is a method of applying a maximum CBG size configured from a higher layer, to X HARQ process numbers 700 and 701 out of HARQ process numbers 700-709, and applying bundling to Y HARQ process numbers 702 and 705. Method 2 assumes that the size of a bitmap of grant-free HARQ-ACK feedback is B, a maximum CBG size configured from a higher layer is $N^{CBG,max}$, the number of grant-free HARQ process numbers is $N_{HARQ-ID}^{Grant-free}$, and a bundling size to be applied to Y HARQ process numbers is $N^{CBG,Bun}$. In this case, the number X of HARQ process numbers to which the maximum CBG size is applicable from among the grant-free HARQ process numbers may be determined based on Equation 2.

$$X = \left\lfloor \frac{B - N^{CBG,Bun} N_{HARQ-ID}^{Grant-free}}{N^{CBG,max} - N^{CBG,Bun}} \right\rfloor \quad \text{Equation 2}$$

The maximum CBG size may be applied to the HARQ processes determined based on Equation 2, and bundling may be applied and thus the CBG size of $N^{CBG,Bun}$ may be applied to $N_{HARQ-ID}^{Grant-free}-X$, i.e., the Y HARQ process numbers. In this case, $N^{CBG,Bun}$ may be signaled from the base station to a UE through the above-described bit signaling. For example, when the higher layer configures the maximum CBG size as 4 bits, and when CBG-based transmission for all HARQ process numbers 1 to 5 is to be performed in the form of a bitmap, the base station may transmit feedback information by applying the maximum CBG size to the X HARQ process numbers 700 and 701 (see reference numerals 706 and 707) and applying bundling to the Y HARQ process numbers 702 and 705 (see reference numerals 708 and 709). When X has a value 0 or a negative value, the base station may apply the above-described Method 1. When the bitmap size after bundling is applied is less than a maximum usable DCI size, the base station may transmit the bitmap by padding a value 0. The UE may calculate X HARQ process numbers using the maximum CBG, based on the bundling size configured from the base station, and receive a bitmap of CBG-based HARQ-ACK feedback. According to Method 2, for bundling, CBG efficiency may be increased by using a maximum CBG size configured by a higher layer.

[Embodiment 3 of the Disclosure]

In the current embodiment of the disclosure, a method of signaling CBG transmission information for all HARQ processes by using a bitmap between a base station and a UE operating in an unlicensed band will be described. Particularly, in the current embodiment of the disclosure, a method of determining a CBG size by using a HARQ process number bitmap will be described.

Operations according to the current embodiment of the disclosure will now be described with reference to FIG. 8.

FIG. 8 is a diagram illustrating a method, performed by a base station, of transmitting feedback by reducing a number of bits used for a CBG-based HARQ-ACK bitmap according to an embodiment of the disclosure.

Referring to FIG. 8, the current embodiment of the disclosure assumes a UE configured to transmit PUCCH/PUSCH in a plurality of grant-free or grant-based slots, and the base station may transmit the above-described bitmap of CBG-based HARQ-ACK feedback.

In addition to the bitmap of CBG-based HARQ-ACK feedback, the base station may transmit a HARQ process number bitmap. The HARQ process number bitmap may signal CBG application to or NACK or ACK information for all HARQ process numbers to the UE through bit signaling. A specific method will now be described.

The base station may signal application of the HARQ process number bitmap to the UE through higher layer configuration or by using DCI. The HARQ process number bitmap may be transmitted as the DCI. The base station may transmit the HARQ process number bitmap by using the bitmap of HARQ-ACK feedback based on the number of usable HARQ process numbers configured from a higher layer. For example, when the bitmap of HARQ-ACK feedback includes 32 bits and HARQ process numbers from 1 to 16 are usable, 16 bits of the bitmap of HARQ-ACK feedback may be used for the HARQ process number bitmap. When the HARQ process number bitmap is signaled, the base station may configure not-transmitted or empty HARQ process numbers as a default value (e.g., NACK). When all CBGs correspond to NACKs as a result of CB-based decoding, the base station may configure a corresponding HARQ process number as NACK 813. The base station may represent HARQ process numbers 800 and 801 out of HARQ process numbers 800-810 to which CBG is applied, as a value 1 (see reference numerals 811 and 812).

When all values of HARQ process numbers corresponding to the HARQ process number bitmap are configured as NACKs, the base station may not represent corresponding HARQ process numbers 802, 804, and 805 in the bitmap of CBG-based HARQ-ACK feedback (see reference numerals 808, 809, and 810). For example, the bitmap of CBG-based HARQ-ACK feedback represents only information about HARQ process numbers represented as a value '1' in a HARQ-ACK bitmap. In this case, the base station may represent grant-based HARQ process numbers 803 and 804 as a value 1 in the HARQ-ACK bitmap, or may represent NACK as a value 0 in the HARQ process number bitmap and then may not include information thereabout in CBG-based HARQ-ACK feedback (see reference numeral 809). In this case, Method 1 or Method 2 according to Embodiment 2 of the disclosure may be applied to the HARQ process numbers represented as a value '1' in the HARQ-ACK bitmap. When the default value is configured as ACK, the above-described method may be applied by configuring ACK in a case when all CBGs correspond to ACKs, and representing HARQ process numbers to which CBG is applied, as a value 0.

The UE may initially decode the HARQ process number bitmap, and then decode the bitmap of CBG-based HARQ-ACK feedback. According to Embodiment 3 of the disclosure, CBG may not be applied to not-used or empty HARQ process numbers and a case when all CBGs correspond to ACKs or NACKs, and thus efficient CBG-based HARQ-ACK feedback may be performed.

Operations of a base station according to an embodiment of the disclosure will now be described with reference to FIG. 9.

Figure 9:
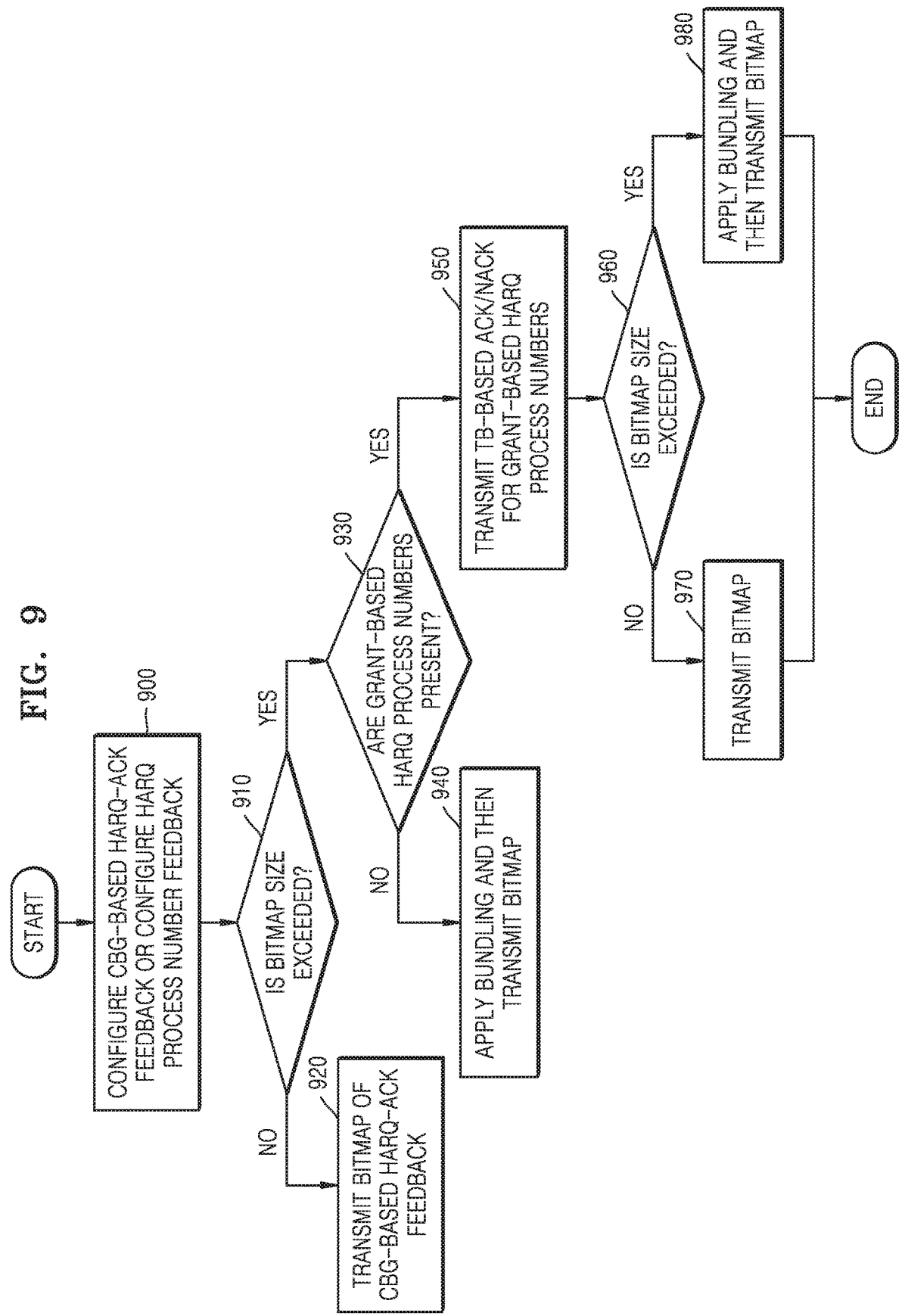
FIG. 9 is a flowchart illustrating operations of a base station for transmitting feedback according to an embodiment of the disclosure.

FIG. 9 is a flowchart illustrating operations of a base station for transmitting feedback according to an embodiment of the disclosure.

Referring to FIG. 9, in operation 900, the base station may configure CBG-based transmission. In operation 910, the base station may compare a bitmap size required to transmit CBG-based HARQ-ACK feedback with a bitmap size usable for DCI by using maximum CBG size information configured by a higher layer. When the bitmap size required to transmit CBG-based HARQ-ACK feedback is not greater than the usable bitmap size, in operation 920, the base station may transmit a bitmap of CBG-based HARQ-ACK feedback. When the number of bits required for CBG-based HARQ-ACK feedback is greater than the usable bitmap size, the base station may determine whether a HARQ process number for the grant-based transmission exists in operation 930. The base station may apply the above-described bundling method in operation 940 or transmit TB-based ACK/NACK, i.e., 1-bit HARQ-ACK feedback, for grant-based HARQ process numbers in operation 950. The base station may determine whether bitmap size required to transmit TB-based HARQ-ACK feedback exceeds an available bitmap in operation 960. When the bitmap size is not exceeded, the base station may transmit the bitmap in operation 970. When the bitmap size is exceeded after TB-based ACK/NACK is transmitted for the grant-based HARQ process numbers, in operation 980, the base station may apply the above-described bundling method to grant-free HARQ process numbers.

To transmit CBG-based HARQ-ACK feedback by using HARQ process number feedback, in operation 900, the base station may signal HARQ process number feedback configuration to a UE by using DCI or through higher layer signaling, and subsequent operations may be performed according to the above-described operations of the base station.

Figure 10:
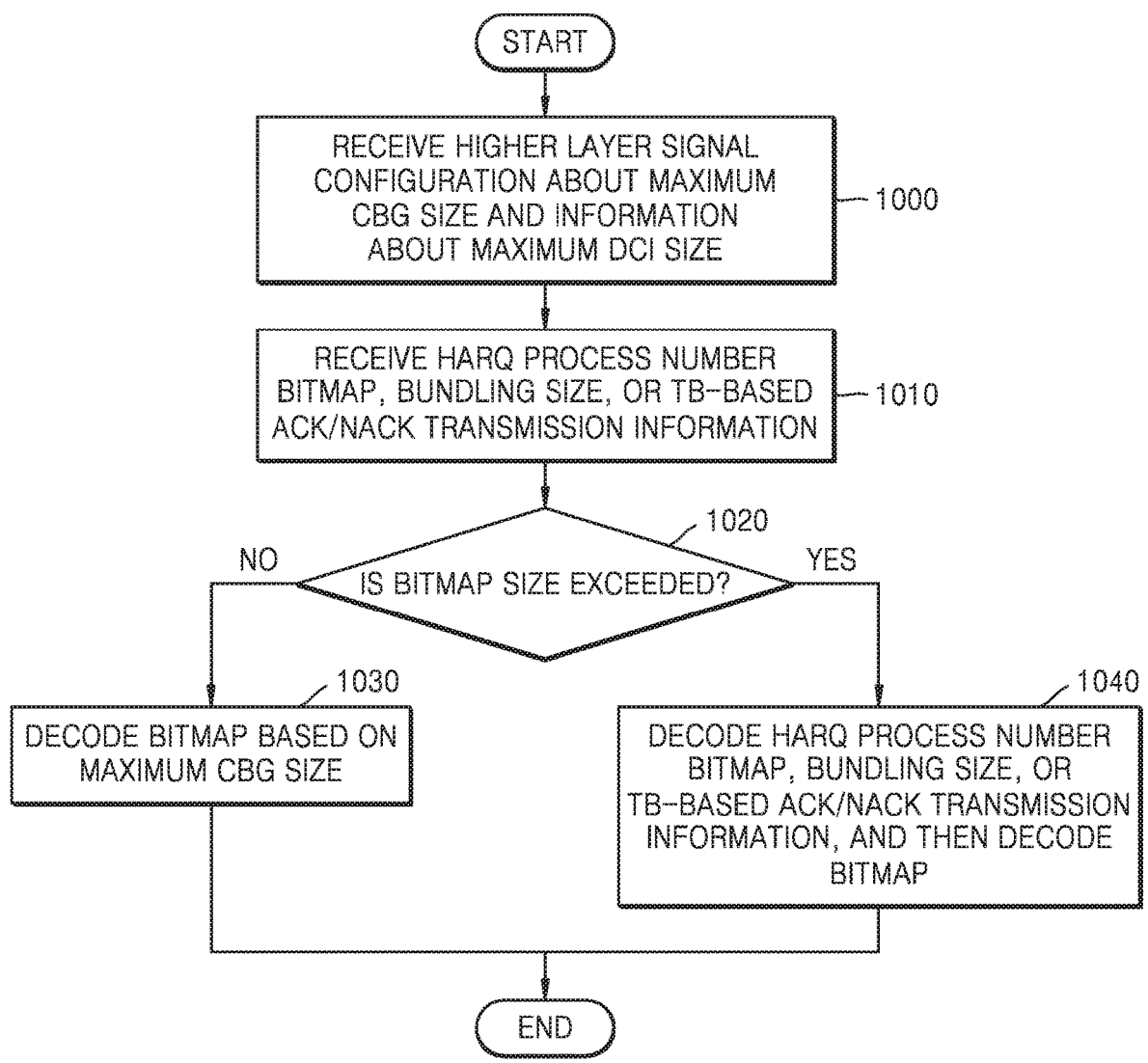
FIG. 10 is a flowchart illustrating operations of a user equipment (UE) for transmitting feedback according to an embodiment of the disclosure.

FIG. 10 is a flowchart illustrating operations of a UE for transmitting feedback according to an embodiment of the disclosure.

Referring to FIG. 10, in operation 1000, the UE may receive, from a base station, a higher layer signal including configuration information about CBG transmission and a maximum CBG size, and configure CBG-based HARQ-ACK feedback transmission and reception based on the received configuration information. In addition, the UE receive information about a maximum bitmap size from the base station. In operation 1010, the UE may receive a HARQ process number bitmap, bundling size information, or TB-based ACK/NACK transmission information from the base station. In operation 1020, the UE may compare the size of a bitmap of CBG-based HARQ-ACK feedback with the maximum bitmap size based on the received information. When the size of the bitmap of CBG-based HARQ-ACK feedback is less than the maximum bitmap size, in operation 1030, the UE may decode the bitmap based on the maximum CBG size. When the size of the bitmap of CBG-based HARQ-ACK feedback is greater than the maximum bitmap size in operation 1020, in operation 1040, the UE may decode the received HARQ process number bitmap, the bundling size information, or the TB-based ACK/NACK transmission information, and then decode the received bitmap of CBG-based HARQ-ACK feedback.

Figure 11:
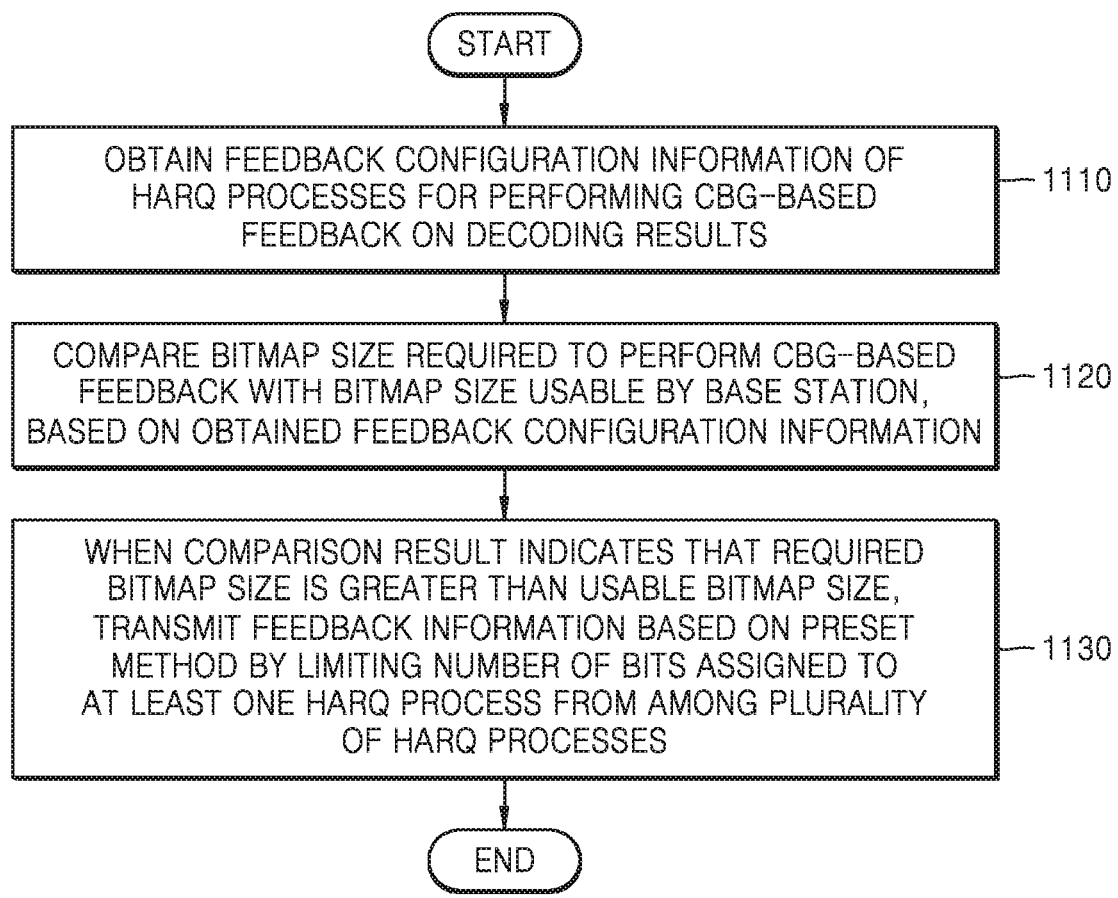
FIG. 11 is a flowchart illustrating operations of a base station for transmitting feedback according to an embodiment of the disclosure.

FIG. 11 is a flowchart illustrating operations of a base station for transmitting feedback according to an embodiment of the disclosure.

Referring to FIG. 11, in operation 1110, the base station may obtain feedback configuration information of HARQ processes for performing CBG-based feedback on decoding results. The feedback configuration information of the HARQ processes may include, for example, information about a bitmap size required to perform CBG-based feedback.

In operation 1120, the base station may compare the bitmap size required to perform CBG-based feedback with a bitmap size usable by the base station, based on the obtained feedback configuration information.

In operation 1130, when the comparison result indicates that the required bitmap size is greater than the usable bitmap size, the base station may transmit feedback information based on a preset method by limiting the number of bits assigned to at least one HARQ process from among a plurality of HARQ processes. In this case, one of or a combination of two or more of Embodiments 1, 2, and 3 of the disclosure may be used as the preset method for limiting the number of bits.

Figure 12:
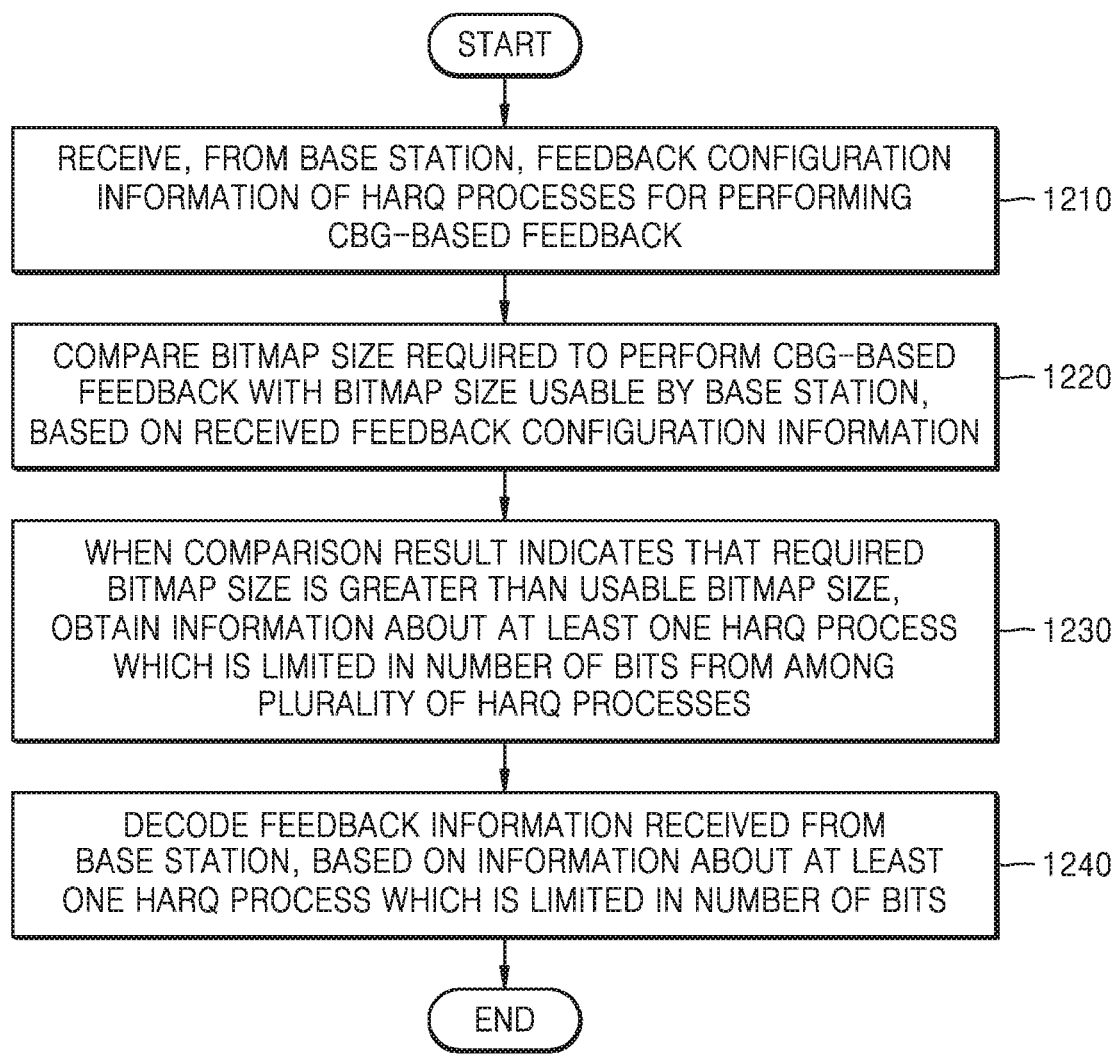
FIG. 12 is a flowchart illustrating operations of a UE for transmitting feedback according to an embodiment of the disclosure.

FIG. 12 is a flowchart illustrating operations of a UE for transmitting feedback according to an embodiment of the disclosure.

Referring to FIG. 12, in operation 1210, the UE may receive, from a base station, feedback configuration information of HARQ processes for performing CBG-based feedback.

In operation 1220, the UE may compare a bitmap size required to perform CBG-based feedback with a bitmap size usable by the base station, based on the received feedback configuration information.

In operation 1230, when the comparison result indicates that the required bitmap size is greater than the usable bitmap size, the UE may obtain information about at least one HARQ process which is limited in the number of bits from among a plurality of HARQ processes. Herein, the information about the at least one HARQ process which is limited in the number of bits from among the plurality of HARQ processes, may include information about at least one of a HARQ process for performing TB-based feedback, a bundling size, or a HARQ process number bitmap. However, the above-described information is merely an example, and the information about the at least one HARQ process which is limited in the number of bits, according to an embodiment of the disclosure, is not limited to the above-described example.

In operation 1240, the UE may decode feedback information received from the base station, based on the information about the at least one HARQ process which is limited in the number of bits.

For example, the UE may decode the feedback information in units of a TB for a grant-based HARQ process, and decode the feedback information in units of a CBG for a grant-free HARQ process, based on the information about the at least one HARQ process which is limited in the number of bits. According to another example, the UE may decode the feedback information according to a bundling size determined based on the information about the at least one HARQ process which is limited in the number of bits.

Figure 13:
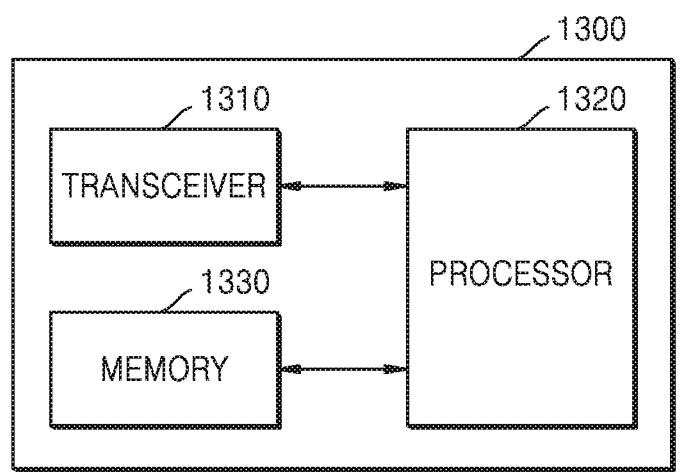
FIG. 13 is a block diagram of a base station according to an embodiment of the disclosure.

FIG. 13 is a block diagram of a base station 1300 according to an embodiment of the disclosure.

Referring to FIG. 13, the base station 1300 according to an embodiment of the disclosure may include a transceiver 1310, a processor 1320, and a memory 1330. The transceiver 1310 may include a receiver and a transmitter, but the receiver and the transmitter will be collectively described as a transceiver in the current embodiment of the disclosure.

The transceiver 1310 may transmit and receive signals to and from a UE. The signals may include control information and data. To this end, the transceiver 1310 may include a radio-frequency (RF) transmitter for up-converting a frequency of and amplifying signals to be transmitted, and an RF receiver for low-noise-amplifying and down-converting a frequency of received signals.

The transceiver 1310 may receive signals through radio channels and output the signals to the processor 1320, and transmit signals output from the processor 1320, through radio channels. The processor 1320 may control a series of procedures to operate the base station 1300 according to the afore-described embodiments of the disclosure. For example, the transceiver 1310 may receive data signals including control signals transmitted from the UE, and the processor 1320 may determine reception results on the control signals and the data signals transmitted from the UE.

As another example, the processor 1320 may perform a channel access procedure in an unlicensed band. Specifically, for example, the transceiver 1310 may receive signals transmitted through the unlicensed band, and the processor 1320 may determine whether the unlicensed band is idle, by comparing an intensity of the received signals with a predefined threshold or a threshold determined based on a function including factors, such as a bandwidth.

As another example, when the transceiver 1310 receives information about a DL transmission duration within a channel occupancy time of the unlicensed band from the UE, the processor 1320 may reconfigure or change PDCCH and PDSCH transmission times or cycles of the base station 1300, and thus the transceiver 1310 may transmit PDCCH and PDSCH.

The processor 1320 may transmit reception results on data signals of the UE, which are received by the transceiver 1310, through the transceiver 1310 to the UE by using a bitmap of CBG-based HARQ-ACK feedback. In this case, the processor 1320 may adjust bitmap information of HARQ-ACK feedback based on information about a determined bitmap size.

The memory 1330 may store control information and data, or control information and data received from the UE, and have a region for storing data required for or generated due to controlling operation of the processor 1320.

Figure 14:
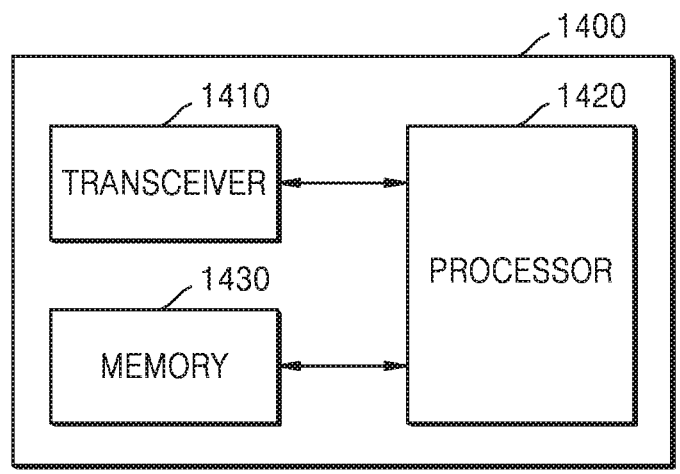
FIG. 14 is a block diagram of a UE according to an embodiment of the disclosure.

FIG. 14 is a block diagram of a UE 1400 according to an embodiment of the disclosure.

Referring to FIG. 14, the UE 1400 according to an embodiment of the disclosure may include a transceiver 1410, a processor 1420, and a memory 1430. The transceiver 1410 may include a receiver and a transmitter, but the receiver and the transmitter will be collectively described as a transceiver in the current embodiment of the disclosure. The transceiver 1410 may transmit and receive signals to and from a base station. The signals may include control information and data. To this end, the transceiver 1410 may include an RF transmitter for up-converting a frequency of and amplifying signals to be transmitted, and an RF receiver for low-noise-amplifying and down-converting a frequency of received signals. The transceiver 1410 may receive signals through radio channels and output the signals to the processor 1420, and transmit signals output from the processor 1420, through radio channels. The processor 1420 may control a series of procedures to operate the UE 1400 the afore-described embodiments of the disclosure. For example, the transceiver 1410 may receive data signals including control signals, and the processor 1420 may determine reception results on the data signals.

As another example, when the transceiver 1410 receives information about a UL or DL transmission duration within a channel occupancy time of an unlicensed band from the base station, the processor 1420 may reconfigure or change a PDCCH transmission time or cycle of the UE 1400 or reconfigure or change time domain assignment information of PUSCH scheduled for the UE 1400, and thus the transceiver 1410 may receive PDCCH transmitted from the base station. The UE 1400 may receive reception results on UL data through the transceiver 1410 from the base station, and the processor 1420 may maintain or change a contention window size used in a channel access procedure for transmitting signals through the unlicensed band, based on the reception results. In the UE 1400, the transceiver 1410 may receive CBG transmission information transmitted from the base station, and the processor 1420 may process a received bitmap of HARQ-ACK feedback based on the received CBG transmission information.

According to an embodiment of the disclosure, because a system and a node for transmitting and receiving CBG-based HARQ-ACK feedback in a wireless communication system configure the number of feedback bits based on HARQ process numbers and purposes, HARQ-ACK feedback may be efficiently transmitted and received.

The embodiments of the disclosure described above with reference to the attached drawings are provided merely to achieve convenience of explanation and to promote understanding of the disclosure, and do not limit the scope of the disclosure. For example, it will be understood by one of ordinary skill in the art that various changes in form and details may be made therein within the technical aspects of the disclosure. The embodiments of the disclosure may operate in combination as necessary. For example, a base station and a UE may operate based on a combination of parts of the methods according to embodiments of the disclosure. Although the embodiments of the disclosure have been described based on 5G or NR systems, modifications thereof based on the technical aspects of the embodiments of the disclosure may also be applied to other systems, such as LTE, LTE-A, and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing, by a base station, communication in a wireless communication system, the method comprising:
   identifying feedback configuration information of a hybrid automatic repeat request (HARQ) process for performing feedback in a unit of a code block group (CBG);
   identifying a HARQ process for grant-free transmission among a plurality of HARQ processes;
   in case that a size of a bitmap required for feedback information of the identified HARQ process for the grant-free transmission is greater than a size of an available bitmap of the base station, performing bundling on the feedback information of the identified HARQ process for the grant-free transmission; and
   transmitting the feedback information based on the performed bundling.

2. The method of claim 1, further comprising:
   identifying a HARQ process used for grant-based transmission among the plurality of HARQ processes; and
   transmitting the feedback information in a unit of a transport block (TB) for the grant-based transmission.

3. The method of claim 1, wherein the performing of the bundling comprises:
   identifying a size of the bundling applied to the identified HARQ process, based on the feedback configuration information; and
   performing the bundling on the feedback information of the identified HARQ process for the grant-free transmission, based on the identified size of the bundling.

4. The method of claim 1, further comprising identifying at least one HARQ process in which the feedback information is transmitted by applying a maximum size of the CBG, based on a size of a bitmap required for feedback information of the at least one HARQ process, a number of at least one HARQ process being used for grant-free transmission, and the maximum size of the CBG,
   wherein the bundling is performed on a HARQ feedback process except for the identified at least one HARQ process among the plurality of HARQ processes.

5. The method of claim 1, further comprising obtaining a HARQ process number bitmap including at least one of information regarding a HARQ process for transmitting CBG-based feedback information, a negative acknowledgement (NACK) or an acknowledgement (ACK),
   wherein the transmitting of the feedback information comprises transmitting the feedback information including the obtained HARQ process number bitmap.

6. A method of performing, by a user equipment, communication in a wireless communication system, the method comprising:
   receiving feedback configuration information of a hybrid automatic repeat request (HARQ) process for performing feedback in a unit of a code block group (CBG), from a base station;
   receiving feedback information of at least one HARQ process, based on the feedback configuration information;
   identifying a HARQ process for grant-free transmission among the at least one HARQ process; and
   in case that a size of a bitmap required for feedback information of the identified HARQ process for the grant-free transmission is greater than a size of an available bitmap of the base station, decoding the received feedback information based on bundling performed on the feedback information at the base station.

7. The method of claim 6, further comprising decoding feedback information in a unit of a transport block (TB) for a HARQ process used for grant-based transmission.

8. The method of claim 6, wherein the decoding of the received feedback information comprises decoding the received feedback information according to a size of bundling indicated based on the feedback configuration information.

9. A base station for performing communication in a wireless communication system, the base station comprising:
   a transceiver; and
   a processor configured to:

identify feedback configuration information of a hybrid automatic repeat request (HARQ) process for performing a feedback, in a unit of a code block group (CBG), identify a HARQ process for grant-free transmission among a plurality of HARQ processes, in case that a size of a bitmap required for feedback information of the identified HARQ process for the grant-free transmission is greater than a size of an available bitmap of the base station, perform bundling on the feedback information of the identified HARQ process for the grant-free transmission, and transmit, via the transceiver, the feedback information based on the performed bundling.

10. The base station of claim 9, wherein the processor is further configured to:

identify a HARQ process used for grant-based transmission among the plurality of HARQ processes, and transmit via the transceiver the feedback information in a unit of a transport block (TB) for the grant-based transmission.

11. The base station of claim 9, wherein the processor is further configured to:

identify a size of the bundling applied to the identified HARQ process, based on the feedback configuration information, and perform the bundling on the feedback information of the identified HARQ process for the grant-free transmission, based on the identified size of the bundling.

12. The base station of claim 9, wherein the processor is further configured to:

identify at least one HARQ process in which the feedback information is transmitted by applying a maximum size of the CBG, based on a size of a bitmap required for feedback information of the at least one HARQ process, a number of at least one HARQ process being used for grant-free transmission, and the maximum size of the CBG, and wherein the bundling is performed on a HARQ feedback process except for the identified at least one HARQ process among the plurality of HARQ processes.

13. The base station of claim 9, wherein the processor is further configured to:

obtain a HARQ process number bitmap including at least one of information regarding a HARQ process for transmitting CBG-based feedback information, a negative acknowledgement (NACK) or an acknowledgement (ACK), and transmit the feedback information including the obtained HARQ process number bitmap.

14. A user equipment (UE) for performing communication in a wireless communication system, the UE comprising:

a transceiver; and a processor coupled with the transceiver and configured to:

receive, via the transceiver, feedback configuration information of a hybrid automatic repeat request (HARQ) process for performing a feedback in a unit of a code block group (CBG), from a base station, receive, via the transceiver, feedback information of at least one HARQ process, based on the feedback configuration information, identify a HARQ process for grant-free transmission among the at least one HARQ process, and in case that a size of a bitmap required for feedback information of the identified HARQ process for the grant-free transmission is greater than a size of an available bitmap of the base station, decode the received feedback information based on bundling performed on the feedback information at the base station.

15. The UE of claim 14, wherein the processor is further configured to decode feedback information in a unit of a transport block (TB) for a HARQ process used for grant-based transmission.

16. The UE of claim 14, wherein the processor is further configured to decode the received feedback information according to a size of bundling indicated based on the feedback configuration information.

* * * * *